United States Patent
Kihara et al.

(10) Patent No.: US 10,645,148 B2
(45) Date of Patent: May 5, 2020

(54) ACCESS CONTROLLING METHOD, APPARATUS, AND NON-TRANSITORY COMPUTER-READABLE RECORDING MEDIUM

(71) Applicant: FUJITSU LIMITED, Kawasaki-shi, Kanagawa (JP)

(72) Inventors: Hideto Kihara, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 15/220,458

(22) Filed: Jul. 27, 2016

(65) Prior Publication Data
US 2017/0034073 A1 Feb. 2, 2017

(30) Foreign Application Priority Data

Jul. 28, 2015 (JP) .................................. 2015-148564

(51) Int. Cl.
*G06F 15/173* (2006.01)
*H04L 29/08* (2006.01)
*H04L 12/927* (2013.01)

(52) U.S. Cl.
CPC ............ *H04L 67/10* (2013.01); *H04L 47/803* (2013.01); *H04L 67/16* (2013.01)

(58) Field of Classification Search
CPC ............................... H04L 67/10; H04L 67/16
USPC ................................................. 709/225, 203
See application file for complete search history.

(56) References Cited

U.S. PATENT DOCUMENTS

| | | | |
|---|---|---|---|
| 5,819,044 A | 10/1998 | Kawabe et al. | |
| 8,738,791 B1* | 5/2014 | Martini | H04L 41/50 709/225 |
| 9,411,572 B2* | 8/2016 | Luk | G06F 8/62 |
| 9,622,024 B1* | 4/2017 | Shanmugam | H04L 41/0806 |
| 9,949,072 B2* | 4/2018 | Barillaud | H04W 76/10 |
| 2008/0140672 A1 | 6/2008 | Tomida et al. | |
| 2010/0302056 A1* | 12/2010 | Dutton | H04W 4/18 340/8.1 |

(Continued)

FOREIGN PATENT DOCUMENTS

| | | |
|---|---|---|
| JP | 08-110880 | 4/1996 |
| JP | 2003-110555 | 4/2003 |

(Continued)

OTHER PUBLICATIONS

JPOA—Office Action of Japanese Patent Application No. 2015-148564 dated Feb. 19, 2019 with Machine Translation.

*Primary Examiner* — Duyen M Doan
(74) *Attorney, Agent, or Firm* — Fujitsu Patent Center

(57) ABSTRACT

An access controlling method that causes a computer to execute processes, the processes including obtaining situation information that indicates at least one of situation of a terminal and an attribute of an owner of the terminal, determining a service corresponding to the obtained situation information among from a plurality of services having access destinations different from each other based on the obtained situation information, and when a service request has been transmitted from the terminal that has been executing an application software, transferring the service request to an access destination corresponding to the determined service, the application software having a function for transmitting a service request to a predetermined access destination.

11 Claims, 32 Drawing Sheets

(56) References Cited

U.S. PATENT DOCUMENTS

| | | | |
|---|---|---|---|
| 2013/0061218 A1* | 3/2013 | Moore | G06F 8/62 |
| | | | 717/177 |
| 2013/0086577 A1 | 4/2013 | Nakashima et al. | |
| 2015/0207861 A1 | 7/2015 | Tobita et al. | |
| 2016/0044583 A1* | 2/2016 | Bahram Pour | H04W 4/02 |
| | | | 455/456.3 |
| 2016/0156638 A1* | 6/2016 | Somani | H04W 12/06 |
| | | | 726/7 |
| 2016/0180345 A1* | 6/2016 | Canpolat | G06Q 30/00 |
| | | | 705/26.1 |

FOREIGN PATENT DOCUMENTS

| | | |
|---|---|---|
| JP | 2008-146212 | 6/2008 |
| JP | 2008-158992 | 7/2008 |
| JP | 2011-258086 | 12/2011 |
| WO | 2014/021054 A1 | 2/2014 |

\* cited by examiner

FIG. 3

| SITUATION NOTIFICATION | SITUATION ID |
|---|---|
| READING ID OF NFC READER IS TEACHER | READING OF TEACHER NFC |
| ENTRANCE AND EXIT GATE FOR TEACHERS | GATE FOR TEACHERS |
| ENTRANCE AND EXIT GATE FOR PUPILS | GATE FOR PUPILS |
| DOORWAY OF CLASSROOM | CLASSROOM |
| ⋮ | ⋮ |

| SITUATION ID | ASSIGNED TICKET |
|---|---|
| GATE FOR TEACHERS | TEACHER |
| GATE FOR PUPILS | PUPIL |
| CLASSROOM | CLASSROOM |
| ⋮ | ⋮ |

FIG. 5

| SITUATION ID | APPLICATION ID | DEMANDED TICKET |
|---|---|---|
| READING OF TEACHER NFC | – | – |
| CLASSROOM | A1001 | TEACHER AND CLASSROOM |
| CLASSROOM | A1002 | – |
| ⋮ | ⋮ | ⋮ |
| SCIENCE LABORATORY | A1001 | TEACHER AND SCIENCE LABORATORY |
| ⋮ | ⋮ | ⋮ |

- "ticketID": "t-1389234673681-76",
- "ticketSort": "com.fujitsu.labs.role",
- "ticketName": "Student",
- "expire": 1406594561852,
- "verificationURL": "http://192.168.1.1:8989"

FIG. 8

| APPLICATION ID | ALLOCATION TICKET | SERVICE URL |
|---|---|---|
| A1001 | CLASSROOM | URL α/X |
|  | SCIENCE LABORATORY | URL α/Y |
|  | ⋮ | ⋮ |

| APPLICATION ID | APPLICATION | 84B |
|---|---|---|
| A1001 | PROJECTOR APPLICATION | |
| A1002 | PUPIL TEACHING MATERIAL DISTRIBUTION APPLICATION | |
| ⋮ | ⋮ | |
| A2001 | COMMON USE REGION APPLICATION 1 | |
| ⋮ | ⋮ | |

APPLICATION A
⋮
URL α
⋮
URL β
⋮

FIG. 27

| APPLICATION ID | ALLOCATION TICKET | SERVICE NAME | COMMON USE KEY | SERVICE URL |
|---|---|---|---|---|
| A1001 (TIMETABLE APPLICATION) | CLASSROOM | TIMETABLE SERVICE | *-this-this | http://··· /scheduleService/room |
| | TEACHER | TIMETABLE SERVICE | *-this-this | http://··· /scheduleService/teacher |
| | CLASSROOM | COMMON USE STORAGE SERVICE | *-this-* | http://··· /shareStorage/scheduleApp |
| | TEACHER | COMMON USE STORAGE SERVICE | *-this-* | http://··· /shareStorage/scheduleApp |
| | CLASSROOM | COMMON USE STORAGE SERVICE | *-*-this | http://··· /shareStorage/room |
| A1002 (PROJECTOR APPLICATION) | CLASSROOM | COMMON USE STORAGE SERVICE | *-*-this | http://··· /shareStorage/room |
| ... | ... | ... | ... | ... |

86C

ACCESS CONTROLLING METHOD, APPARATUS, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2015-148564, filed on Jul. 28, 2015, the entire contents of which are incorporated herein by reference.

FIELD

The technology disclosed herein is related to an access controlling method, an access controlling apparatus, and a non-transitory computer-readable recording medium.

BACKGROUND

As a technology applicable to a technology for switching a service to be provided to application software (hereinafter referred to simply as "application"), a technology is known which relates to change of setting information of a shared directory provided by a file server apparatus. According to the technology, a logical shared address designated to a client computer is converted into a physical shared address at which the shared directory actually exists.

As a technology applicable to a technology for switching a service to be provided to an application, also a technology is known which makes it possible to access a virtual resource obtained by a given procedure performed for an existing resource in the past. According to the technology, names of virtual resources, physical positions of actually existing resources, and names of procedures for handling the actually existing resources are retained and managed in an associated relationship with one another. This makes it possible to virtualize resources of a plurality of computer systems of a network information system to enhance the elasticity of the entire system.

SUMMARY

According to an aspect of the embodiment, an access controlling method that causes a computer to execute processes, the processes including obtaining situation information that indicates at least one of situation of a terminal and an attribute of an owner of the terminal, determining a service corresponding to the obtained situation information among from a plurality of services having access destinations different from each other based on the obtained situation information, and when a service request has been transmitted from the terminal that has been executing an application software, transferring the service request to an access destination corresponding to the determined service, the application software having a function for transmitting a service request to a predetermined access destination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of a situation identification (ID) table;

FIG. 4 is a view illustrating an example of a situation ticket table;

FIG. 5 is a view illustrating an example of a demanded ticket table;

FIG. 6 is a schematic view illustrating an example of ticket information;

FIG. 8 is a view illustrating an example of an allocation table according to the first embodiment;

FIG. 15 is a view illustrating an example of an application management table according to the second embodiment;

FIG. 27 is a view illustrating an example of an allocation table according to the fourth embodiment;

DESCRIPTION OF EMBODIMENTS

In regard to a technology for switching a service to be utilized by an application in a terminal in response to a situation of the terminal (hereinafter referred to as "terminal situation"), the following two technologies are available. In particular, according to a first one of the technologies, the side to which a request for a service is issued (a service providing program of a server) decides a terminal situation to switch the process (service contents). According to a second one of the technologies, the side that issues a request for a service (application of a terminal) decides a terminal situation to switch the destination of a request for a service.

In the first technology, it is significant to incorporate a function for deciding a terminal situation and switching a process (service contents) in response to the decided terminal situation in each of a plurality of different service providing programs that provide different services from one another. Meanwhile, in the second technology, it is significant to incorporate a function for deciding a terminal situation and switching the destination of a request for a service in response to the decided terminal situation in each of a plurality of different applications that are different in type from one another. Accordingly, both technologies have a subject that they are complicated very much in configuration. It is to be noted that the technologies described above do not take into consideration in response to a terminal situation and therefore are not useful to solve the subject described hereinabove.

The embodiments disclosed herein contemplate, as an aspect thereof, implementation of switching of a service to be provided in response to a situation of a terminal by a simple configuration.

In the following, examples of embodiments of the disclosed technology are described in detail with reference to the drawings. It is to be noted that the disclosed technology is described below in connection with modes in which the technology is applied to an educational site in a school (hereinafter referred to as "school of the management target").

First Embodiment

Figure 1:
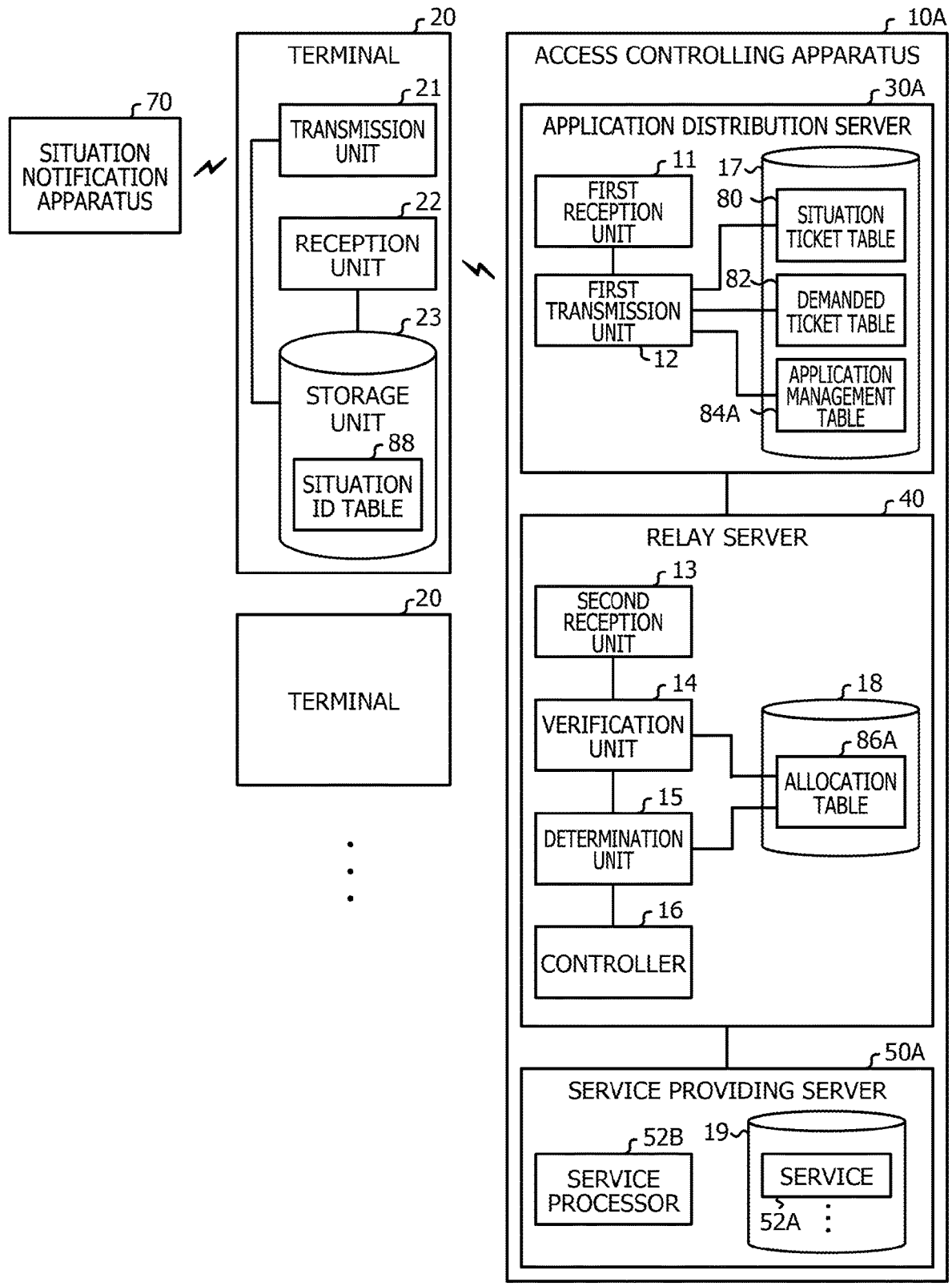
FIG. 1 is a functional block diagram of an access controlling apparatus and terminals according to a first embodiment.

FIG. 1 depicts an access controlling apparatus and a plurality of terminals according to a first embodiment. An access controlling apparatus 10A includes an application distribution server 30A that distributes applications to terminals 20, a relay server 40 that relays a service request from a terminal 20, and a service providing server 50A that provides a service requested from the terminal 20. It is to be noted that web services are provided by the service providing server 50A in the present embodiment.

The application distribution server 30A includes a first reception unit 11, a first transmission unit 12, and a storage unit 17. The storage unit 17 stores therein a situation ticket table 80, a demanded ticket table 82, and an application management table 84A.

The first reception unit 11 receives information representative of a situation of a terminal 20 (hereinafter referred to as "situation information") from the terminal 20. The situation information transmitted from the terminal 20 includes a situation ID in the form of a code representative of a situation of the terminal 20. The situation information transmitted from the terminal 20 further includes user attribute information representative of an attribute of a user who owns the terminal 20 and place information representative of a place at which the terminal 20 exists. It is to be noted that, while, in the present embodiment, information representative of a role of the user is applied as the user attribute information, the user attribute information is not limited to this information, but some other information such as the name of the user or the affiliation of the user may be applied if the information represents an attribute of the user.

If the first reception unit 11 receives situation information from a terminal 20, then the first transmission unit 12 acquires ticket information corresponding to the situation of the terminal 20 indicated by the situation ID included in the received situation information from the situation ticket table 80 and transmits the acquired ticket information to the terminal 20 of the situation information transmission source. FIG. 4 is a view illustrating an example of a situation ticket table. The situation ticket table illustrated in FIG. 4 may be the situation ticket table 80 illustrated in FIG. 1. As illustrated in FIG. 4, the situation ticket table 80 stores therein situation IDs and ticket information (assigned ticket) to be assigned to the terminals 20 of the situations indicated by the situation IDs in an associated relationship with each other. The first transmission unit 12 refers to the situation ticket table 80 to acquire ticket information corresponding to a situation ID included in the situation information received by the first reception unit 11 and transmits the acquired ticket information to the terminal 20 of the transmission source of the situation ID.

It is to be noted that, as an example, the situation ticket table 80 illustrated in FIG. 4 indicates that, to a terminal 20 from which situation information including a situation ID indicating the passage through a "gate for teachers" is transmitted, ticket information representative of "teacher" is to be transmitted. Further, to a terminal 20 from which situation information including a situation ID indicating the passage through a "gate for pupils" is transmitted, ticket information representative of "pupil" is to be transmitted.

FIG. 6 illustrates an example of ticket information according to the present embodiment. Ticket information 72 includes five different types of information of "ticket ID," "ticket Sort," "ticket Name," "expire," and "verification uniform resource locators (URLs)."

"ticket ID" is an identifier of the ticket information 72. "ticket Sort" indicates contents or meaning of the ticket information 72. Further, "ticket Name" is information representative of the name of the ticket information 72. "expire" is information indicating an expiration date of the ticket information 72. In the present embodiment, the expiration date is defined as information indicating an elapsed time period from the counting date determined as the expiration date. Further, "verification URL" indicates the uniform resource identifier (URI) of the issuance source of the ticket information 72 (in the present embodiment, the application distribution server 30A).

Although details are hereinafter described, a terminal 20 receives ticket information transmitted by the first transmission unit 12 of the access controlling apparatus 10A and stores the ticket information into a storage unit 23. Thereafter, if, when the terminal 20 transmits situation information, ticket information is stored in the storage unit 23, then the terminal 20 transmits the ticket information to the access controlling apparatus 10A.

Meanwhile, when the first reception unit 11 receives situation information and so forth from the terminal 20, the first transmission unit 12 refers to the demanded ticket table 82 to decide where or not there is an application to be distributed to the terminal 20 associated with the situation ID included in the received situation information.

FIG. 5 is a view illustrating an example of a demanded ticket table. The demanded ticket table illustrated in FIG. 5 may be the demanded ticket table 82 illustrated in FIG. 1. As depicted in FIG. 5, the demanded ticket table 82 stores therein situation IDs, application IDs of applications to be distributed in a situation indicated by the situation IDs, and demanded tickets representative of ticket information demanded for distribution of the applications of the application IDs in an associated relationship with one another. In FIG. 5, it is indicated that, for example, "A1001 (projector application)" and "A1002 (pupil teaching material distribution application)" are designated as application IDs of applications to be distributed in a situation whose situation ID is "classroom."

Further, the applications whose application ID is registered in the demanded ticket table 82 include applications that demand ticket information upon distribution of the application to the terminal 20 and applications that do not demand ticket information. In the example illustrated in FIG. 5, the application whose application ID is "A1001" corresponds to an application that demands ticket information while the application whose application ID is "A1002" corresponds to an application that does not demand ticket information. For example, the application whose application ID is "A1001" demands ticket information of "teacher" and "classroom" when the situation ID is "classroom" and demands, where the situation ID is "science laboratory," ticket information of "teacher" and "science laboratory."

The first transmission unit 12 searches the demanded ticket table 82 using the situation ID included in the situation information received from the terminal 20 as a key and determines, if an application ID is registered in an associated relationship with the situation ID in the demanded ticket table 82, that there is an application to be distributed to the terminal 20. However, if the application of the registered application ID is an application that demands ticket information (if a demanded ticket is registered), then the first transmission unit 12 determines whether or not ticket information registered as a demanded ticket has been received from the terminal 20. Then, if the ticket information registered as a demanded ticket has been received from the terminal 20, then the first transmission unit 12 determines that there is an application to be distributed to the terminal 20.

If it is decided that there is an application to be distributed to the terminal 20, then the first transmission unit 12 searches the application management table 84A using the application ID registered in the demanded ticket table 82 as a key to acquire an application to be distributed to the terminal 20 from the application management table 84A. Then, the first transmission unit 12 transmits the application ID acquired from the demanded ticket table 82 and the application acquired from the application management table 84A to the terminal 20.

Figure 7:
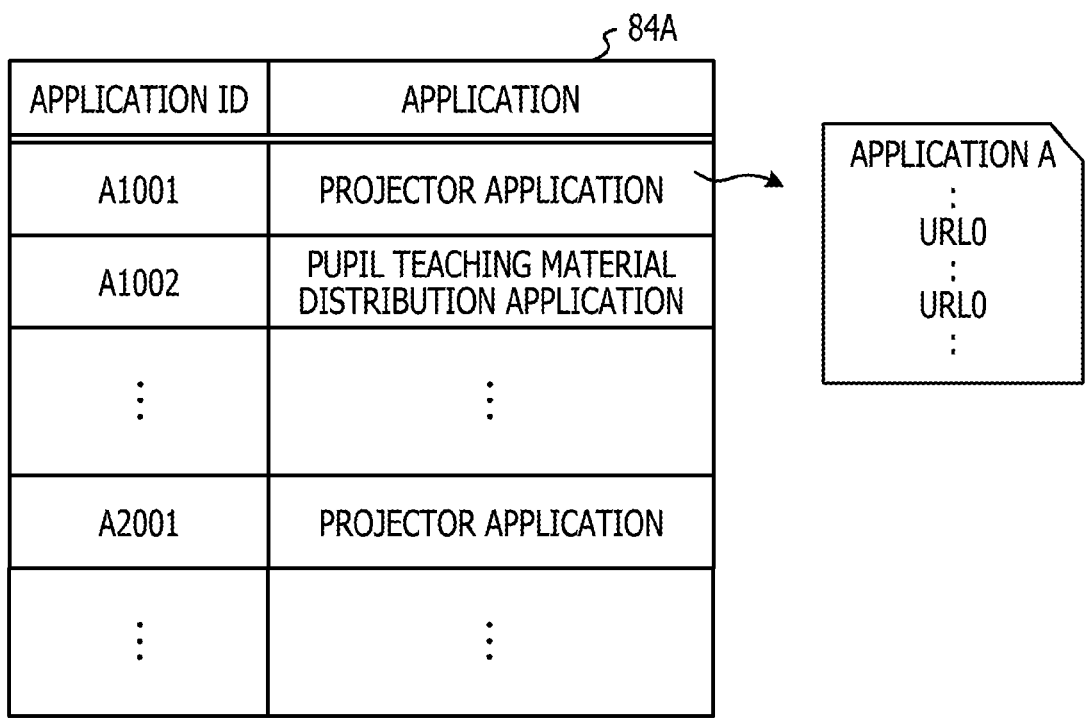
FIG. 7 is a view illustrating an example of an application management table according to the first embodiment.

FIG. 7 is a view illustrating an example of an application management table. The application management table illustrated in FIG. 7 may be the application management table 84A illustrated in FIG. 1. As illustrated in FIG. 7, in the application management table 84A, application IDs and (the program body of) the applications are registered in an associated relationship with each other. In the example illustrated in FIG. 7, "projector application" is registered in an associated relationship with the application ID "A1001," and "pupil teaching material distribution application" is registered in an associated relationship with the application ID "A1002." Further, "projector application" is registered in an associated relationship with the application ID "A2001."

Further, (the program body of) of each of the applications registered in the application management table 84A includes a service requesting step for transmitting a service request to the access controlling apparatus 10A. In the present first embodiment, to the service requesting step of each application, the address of the relay server 40 (in the example illustrated in FIG. 7, "URL0": hereinafter referred to as "specific URL") is set as an access destination (transmission source of service request). Therefore, a developer of each application may not incorporate a function for detecting a situation of a terminal 20 and switching the access destination of the service requesting step in response to the detected situation into the application to be developed. Therefore, the man-hour and the cost for the development of the application are reduced.

The relay server 40 includes a second reception unit 13, a verification unit 14, a determination unit 15, a controller 16, and a storage unit 18. The storage unit 18 has an allocation table 86A stored therein.

In the present first embodiment, a service request is transmitted from a terminal 20 with the relay server 40 designated as a destination (with the specific URL designated as the access destination). The second reception unit 13 receives a service request transmitted from the terminal 20. It is to be noted that an application ID and ticket information are added to the service request transmitted from the terminal 20, and the second reception unit 13 receives the application ID and the ticket information added to the service request.

The verification unit 14 refers to the allocation table 86A to verify whether or not the combination of the application ID and the ticket information received from the terminal 20 by the second reception unit 13 is valid. If the combination of the application ID and the ticket information is stored in the allocation table 86A, then the verification unit 14 determines that the combination is valid and the service request received from the terminal 20 is a legitimate service request.

FIG. 8 is a view illustrating an example of an allocation table. The allocation table illustrated in FIG. 8 may be the allocation table 86A illustrated in FIG. 1. As illustrated in FIG. 8, the allocation table 86A has application IDs, allocation tickets, and service URLs registered in an associated relationship with each other therein. Into the application ID, the application ID of an application that transmits a service request is registered. In the allocation ticket, ticket information for allocating a service requested by a service request transmitted from an application of a corresponding application ID in response to a situation of the terminal 20 is registered. If the combination of the application ID and the ticket information added to the service request received from the terminal 20 is registered in the allocation table 86A, then it can be decided that the received service request is a legitimate service request.

Further, in the service URL, information indicative of an access destination of a corresponding service specified in response to the combination of the corresponding application ID and the allocation ticket is registered. In the example illustrated in FIG. 8, it is indicated that, where the application ID is "A1001" and the allocation ticket is "classroom," the access destination of the service is "URLα/X."

If it is decided by the verification unit 14 that the combination of the application ID and the ticket information is valid, then the determination unit 15 acquires a service URL corresponding to the combination of the application ID and the ticket information from the allocation table 86A. Then, the controller 16 transfers the service request received from the terminal 20 to the service URL acquired by the determination unit 15. Consequently, the service request that designates the specific URL transmitted from the terminal 20 as the access destination (in the present embodiment, the hypertext transfer protocol (HTTP) request) is received as a service request for the service URL by the service providing server 50A.

The service providing server 50A includes a storage unit 19, in which a plurality of service processing program data 52A (in FIG. 1, represented as "service") are stored. Each service processing program data 52A at least includes a program for performing a process for providing a service. The program functions, when it is executed, as a service processor 52B depicted in FIG. 1 and performs a process for providing a service. Further, the individual service processing program data 52A are different from each other at least in one of type of a service to be provided and a situation of the corresponding terminal 20.

For example, although services that can be provided by the service providing server 50A include a projector service for controlling operation of a projector, the storage unit 19 stores therein a plurality of service processing program data 52A for providing a projector service. The plurality of service processing program data 52A that provide the projector service are configured such that they control operation of projectors installed at locations different from each other (for example, classrooms, a science laboratory and so forth) in accordance with a service request from the projector application. Thus, the plurality of service processing program data 52A for providing the projector service provide a projector service to a terminal 20 in a situation in which the terminal 20 is located at a place at which a projector of a control target is installed.

It is to be noted that, also as regards a service processing program data 52A for providing a service other than the projector service, a plurality of service processing program data 52A for corresponding terminals 20 whose situations are different from each other are stored in the storage unit 19.

Further, each service processing program data 52A stored in the storage unit 19 includes, depending upon the type of a service to be provided, also data to be distributed to a terminal 20. For example, the service processing program data 52A for performing a pupil teaching material distribution service for distributing a pupil teaching material in accordance with a service request from the pupil teaching material application includes data of a pupil teaching material of a distribution target.

Further, to the individual service processing program data 52A stored in the storage unit 19, service URLs different from each other are allotted. Further, in the service providing server 50A, programs included in the individual service processing program data 52A stored in the storage unit 19 are activated and executed in advance. Accordingly, if the service providing server 50A receives a service request whose access destination is the specific service URL from the relay server 40, then the service request is passed to the service processing program data 52A to which the specific service URL is allotted.

Meanwhile, each of the plurality of terminals 20 in the present embodiment includes a transmission unit 21, a reception unit 22, and the storage unit 23. The storage unit 23 has a situation ID table 88 stored therein.

The transmission unit 21 specifies a situation ID on the basis of a situation notification received from a situation notification apparatus 70. In the present embodiment, at each place that is passed by a user of a terminal 20 (hereinafter referred to as "passage position") when the user enters a place determined in advance with some kind of purpose and when the user leaves the place, a situation notification apparatus 70 is provided. When the user of the terminal 20 passes some passage position, the terminal 20 is placed into a state in which the terminal 20 can communicate with the situation notification apparatus 70. The situation notification apparatus 70 transmits a situation notification including at least one of place information indicative of the passage position at which the situation notification apparatus 70 itself is provided and user attribute information corresponding to the user who can pass the passage position to the terminal 20 that passes the passage position. The transmission unit 21 refers to the situation ID table 88 to specify the corresponding situation ID on the basis of the situation notification received from the situation notification apparatus 70.

FIG. 3 is a view illustrating an example of a situation ID table. The situation ID table illustrated in FIG. 3 may be the situation ID table 88 illustrated in FIG. 1. As depicted in FIG. 3, the situation ID table 88 stored in the storage unit 23 stores therein a situation notification received from the situation notification apparatus 70 and a situation ID corresponding to the situation notification in an associated relationship with each other. In the example depicted in FIG. 3, a situation notification corresponding to the situation of the terminal 20 of "entrance and exit gate for teachers" (situation that the terminal 20 passes an entrance and exit gate for teachers hereinafter described) is associated with the situation ID of "gate for teachers." Further, in the example depicted in FIG. 3, a situation notification corresponding to the situation of the terminal 20 of "entrance and exit gate for pupils" (situation that the terminal 20 passes an entrance and exit gate for pupils hereinafter described) is associated with the situation ID of "gate for pupils.". It is to be noted that these situations correspond to the user attribute information described hereinabove.

Further, the transmission unit 21 generates entry-exit information indicative of whether the passage of the own apparatus through the passage position is passage for check-in to a target place or passage for check-out from a target place. It is to be noted that, in the present embodiment, the transmission unit 21 generates, as the entry-exit information, information indicative of "check-in" when the passage of the same passage position is an odd-numbered passage and generates information indicative of "check-out" when the passage of the same passage position is an even-numbered passage.

The transmission unit 21 transmits the specified situation ID and the generated entry-exit information as situation information to the access controlling apparatus 10A. When the access controlling apparatus 10A receives the situation information from the terminal 20, if the entry-exit information included in the received situation information is information indicative of check-in, then the access controlling apparatus 10A transmits ticket information corresponding to the received situation ID to the terminal 20. Further, if an application that corresponds to the situation ID included in the received situation information and does not demand ticket information exists, then if the received entry-exit information is information indicative of check-in, then the access controlling apparatus 10A transmits the application and the application ID of the application to the terminal 20.

In this case, the reception unit 22 receives the ticket information, application, and application ID transmitted from the access controlling apparatus 10A. Then, the reception unit 22 stores the received ticket information, application, and application ID into the storage unit 23.

On the other hand, if the situation ID specified on the basis of the situation notification received from the situation notification apparatus 70 changes, then if ticket information is stored in the storage unit 23, then the transmission unit 21 transmits also the ticket information to the access controlling apparatus 10A together with the situation information. When the access controlling apparatus 10A receives the situation information and the ticket information, if the entry-exit information included in the received information is information indicative of check-in, then the access controlling apparatus 10A transmits an application and an application ID corresponding to the combination of the received situation ID and the ticket information to the terminal 20.

In this case, the reception unit 22 receives the application and the application ID transmitted from the access controlling apparatus 10A. Then, the reception unit 22 stores the received application and application ID into the storage unit 23.

The application stored in the storage unit 23 is suitably executed by the terminal 20. As described hereinabove, the application in the present embodiment includes a service requesting step for transmitting a service request to the access controlling apparatus 10A. Therefore, if the service requesting step of the application is executed by the terminal 20, then the transmission unit 21 transmits a service request (particularly, an HTTP request) to the access controlling apparatus 10A from the terminal 20. Along with this, the transmission unit 21 transmits the application ID of the corresponding application and the ticket information stored in the storage unit 23 at the point of time to the access controlling apparatus 10A together with the service request. However, in the present embodiment, the address of the relay server 40 is set as an access destination in the service requesting step of each application, and the service request described above is transmitted to the relay server 40.

Figure 2:
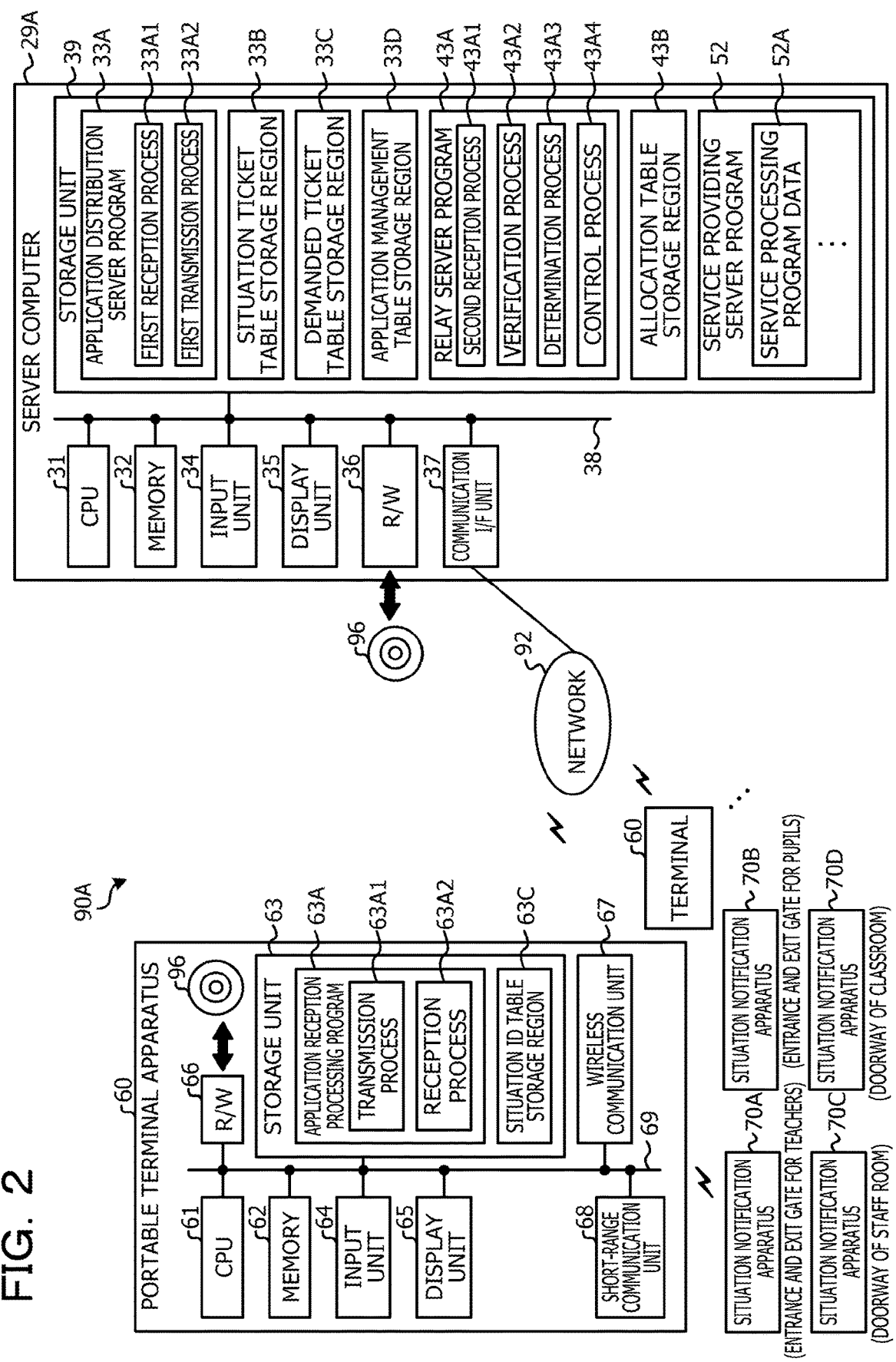
FIG. 2 is a schematic block diagram of a computer system according to the first embodiment.

FIG. 2 is a schematic block diagram of a computer system. The access controlling apparatus 10A described above can be implemented by a server computer 29A included in a computer system 90A depicted in FIG. 2. Further, each terminal 20 and the situation notification apparatus 70 described hereinabove can be implemented individually by a portable terminal apparatus 60 and a plurality of (in FIG. 2, four) situation notification apparatus 70A to 70D included in the computer system 90A. The computer system 90A includes the server computer 29A and a plurality of portable terminal apparatus 60 capable of accessing a network 92, and a plurality of situation notification apparatus 70A to 70D. It is to be noted that, when each of the situation notification apparatus 70A to 70D is to be described without distinction from the other situation notification apparatus in the following description, it is described as "situation notification apparatus 70" omitting the corresponding one of the suffixes A to D.

The portable terminal apparatus 60 is a terminal distributed to each of the teachers and pupils belonging to a school of a management target in advance. The portable terminal apparatus 60 includes a central processing unit (CPU) 61, a memory 62, a storage unit 63, an inputting unit 64, a display unit 65, a medium reading-writing apparatus (R/W) 66, a wireless communication unit 67, and a short-range communication unit 68. The CPU 61, the memory 62, the storage unit 63, the inputting unit 64, the display unit 65, the R/W 66, the wireless communication unit 67, and the short-range communication unit 68 are coupled to each other by a bus 69. The R/W 66 performs reading out of information written in a recording medium 96 and writing of information into the recording medium 96.

The storage unit 63 can be implemented by a hard disk drive (HDD), a flash memory or the like. The storage unit 63 stores therein an application reception processing program 63A for causing the portable terminal apparatus 60 to function as the terminal 20 depicted in FIG. 1.

The application reception processing program 63A is stored into the storage unit 63 by the R/W 66 reading out the application reception processing program 63A from the recording medium 96 after the recording medium 96 in which the application reception processing program 63A is written is set to the R/W 66. The CPU 61 reads out the application reception processing program 63A from the storage unit 63 and develops the application reception processing program 63A in the memory 62 and then successively executes processes the application reception processing program 63A has.

The application reception processing program 63A includes a transmission process 63A1 and a reception process 63A2. The CPU 61 operates as the transmission unit 21 depicted in FIG. 1 by executing the transmission process 63A1. The CPU 61 operates as the reception unit 22 depicted in FIG. 1 by executing the reception process 63A2. Consequently, the portable terminal apparatus 60 executing the application reception processing program 63A functions as the terminal 20 depicted in FIG. 1.

Further, the storage unit 63 has a situation ID table storage region 63C provided therein. The CPU 61 creates the situation ID table 88 depicted in FIG. 1 by developing data stored in the situation ID table storage region 63C in the memory 62.

Further, the short-range communication unit 68 performs short-range communication in accordance with a communication standard determined in advance with the situation notification apparatus 70. It is to be noted that the short-range communication unit 68 applies near field communication (NFC) as the communication standard mentioned above. Therefore, when the user of the portable terminal apparatus 60 passes a passage position described hereinabove, the user would hold up the terminal 20 to a given communicatable position of the situation notification apparatus 70. It is to be noted that the communication standard to be applied to the short-range communication unit 68 is not limited to NFC. Some other wireless communication standard such as, for example, Bluetooth (registered trademark) or infrared data association (IrDA) (registered trademark) may be applied as the communication standard of the short-range communication unit 68.

Meanwhile, the server computer 29A is provided at some place (for example, in a staff room), for example, of a school of a management target. The server computer 29A includes a CPU 31, a memory 32, a storage unit 39, an inputting unit 34, a display unit 35, a medium reading-writing apparatus (R/W) 36, and a communication interface (I/F) unit 37. The CPU 31, the memory 32, the storage unit 39, the inputting unit 34, the display unit 35, the R/W 36, and the communication I/F unit 37 are coupled to each other by a bus 38.

The R/W 36 performs reading out of information written in a recording medium 96 and writing of information into the recording medium 96.

The storage unit 39 can be implemented by an HDD, a flash memory or the like. The storage unit 39 stores therein an application distribution server program 33A, a relay server program 43A, and a service providing server program 52. It is to be noted that the application distribution server program 33A is a program for causing the server computer 29A to function as the application distribution server 30A, and the relay server program 43A is a program for causing the server computer 29A to function as the relay server 40. Further, the service providing server program 52 is a program for causing the server computer 29A to function as the service providing server 50A.

The programs 33A, 43A, and 52 described above are stored into the storage unit 39 by the R/W 36 performing reading out of the programs 33A, 43A, and 52 from the recording medium 96 in which the programs 33A, 43A, and 52 are written and which is set to the R/W 36. It is to be noted that the programs 33A, 43A, and 52 are an example of part of access controlling programs according to the disclosed technology.

The CPU 31 reads out the application distribution server program 33A from the storage unit 39 and develops the application distribution server program 33A in the memory 32 and then successively executes processes the application distribution server program 33A has. The application distribution server program 33A includes a first reception process 33A1 and a first transmission process 33A2. The CPU 31 operates as the first reception unit 11 depicted in FIG. 1 by executing the first reception process 33A1. Further, the CPU 31 operates as the first transmission unit 12 depicted in FIG. 1 by executing the first transmission process 33A2. Consequently, the server computer 29A executing the application distribution server program 33A functions as the application distribution server 30A depicted in FIG. 1.

Further, the CPU 31 reads out the relay server program 43A from the storage unit 39 and develops the relay server program 43A in the memory 32 and then successively executes processes the relay server program 43A has. The relay server program 43A includes a second reception process 43A1, a verification process 43A2, a determination process 43A3, and a control process 43A4. The CPU 31 operates as the second reception unit 13 depicted in FIG. 1 by executing the second reception process 43A1. Further, the CPU 31 operates as the verification unit 14 depicted in FIG. 1 by executing the verification process 43A2. Further, the CPU 31 operates as the determination unit 15 depicted in FIG. 1 by executing the determination process 43A3. Furthermore, the CPU 31 operates as the controller 16 depicted in FIG. 1 by executing the control process 43A4. Consequently, the server computer 29A executing the relay server program 43A functions as the relay server 40 depicted in FIG. 1.

The CPU 31 reads out the service providing server program 52 from the storage unit 39 and develops the service providing server program 52 in the memory 32 and then executes the service providing server program 52. The service providing server program 52 includes a plurality of service processing program data 52A. Consequently, the server computer 29A executing the service providing server program 52 functions as the service providing server 50A depicted in FIG. 1.

Further, the storage unit 39 includes a situation ticket table storage region 33B, a demanded ticket table storage region 33C, an application management table storage region 33D, and an allocation table storage region 43B. The CPU 31 creates the situation ticket table 80 depicted in FIG. 1 by developing data stored in the situation ticket table storage region 33B in the memory 32. Further, the CPU 31 creates the demanded ticket table 82 depicted in FIG. 1 by developing data stored in the demanded ticket table storage region 33C in the memory 32. Furthermore, the CPU 31 creates the application management table 84A depicted in FIG. 1 by developing data stored in the application management table storage region 33D in the memory 32. The CPU 31 crates the allocation table 86A depicted in FIG. 1 by developing data stored in the allocation table storage region 43B in the memory 32.

Meanwhile, as depicted in FIG. 2, the situation notification apparatus 70A from among the situation notification apparatus 70A to 70D in the present embodiment is provided for an entrance and exit gate for teachers of a school of a management target, and the situation notification apparatus 70B is provided for an entrance and exit gate for pupils of the school of the management target. Further, the situation notification apparatus 70C is provided for a doorway of a staff room of the school of the management target, and the situation notification apparatus 70D is provided for a doorway of a classroom of a school of a management target hereinafter described.

It is to be noted that each of the situation notification apparatus 70A to 70C transmits a situation notification including the user attribute information described hereinabove to the terminal 20 (portable terminal apparatus 60) held up over the communicatable position. Meanwhile, the situation notification apparatus 70D transmits a situation notification including the place information described hereinabove to the terminal 20 held up over the communicatable position. For example, the situation notification apparatus 70A and the situation notification apparatus 70C transmit a situation notification including information of "teacher" to the terminal 20, and the situation notification apparatus 70B transmits a situation notification including information of "pupil" to the terminal 20. Further, the situation notification apparatus 70D transmits a situation notification including information of "classroom" to the terminal 20. Since the terminal 20 in the present embodiment adopts NFC as the communication standard of the short-range communication unit 68 as described hereinabove, also the situation notification apparatus 70 adopts NFC as the communication standard.

It is to be noted that, while the portable terminal apparatus 60 is described as having a mode in which a tablet personal computer (PC) for universal use wherein a touch panel is provided on the display face of the display unit 65, the portable terminal apparatus 60 is not limited to this. Some other computer such as a notebook type PC may be applied as the portable terminal apparatus 60. Alternatively, not the PCs described above but a smartphone may be applied as the portable terminal apparatus 60.

Further, while the server computer 29A in the present embodiment is installed in a given room of a school of a management target (in the present embodiment, in a staff room), the location of the server computer 29A is not limited to this. For example, the server computer 29A may be installed in a different room of the school of the management target or may be installed in a building different from the school of the management target. Further, while, in the present embodiment, the server computer 29A has various functions implemented as the application distribution server 30A, the relay server 40, and the service providing server 50A, the implementation is not limited to this, and the servers mentioned may be implemented by computers different from each other.

Figure 9:
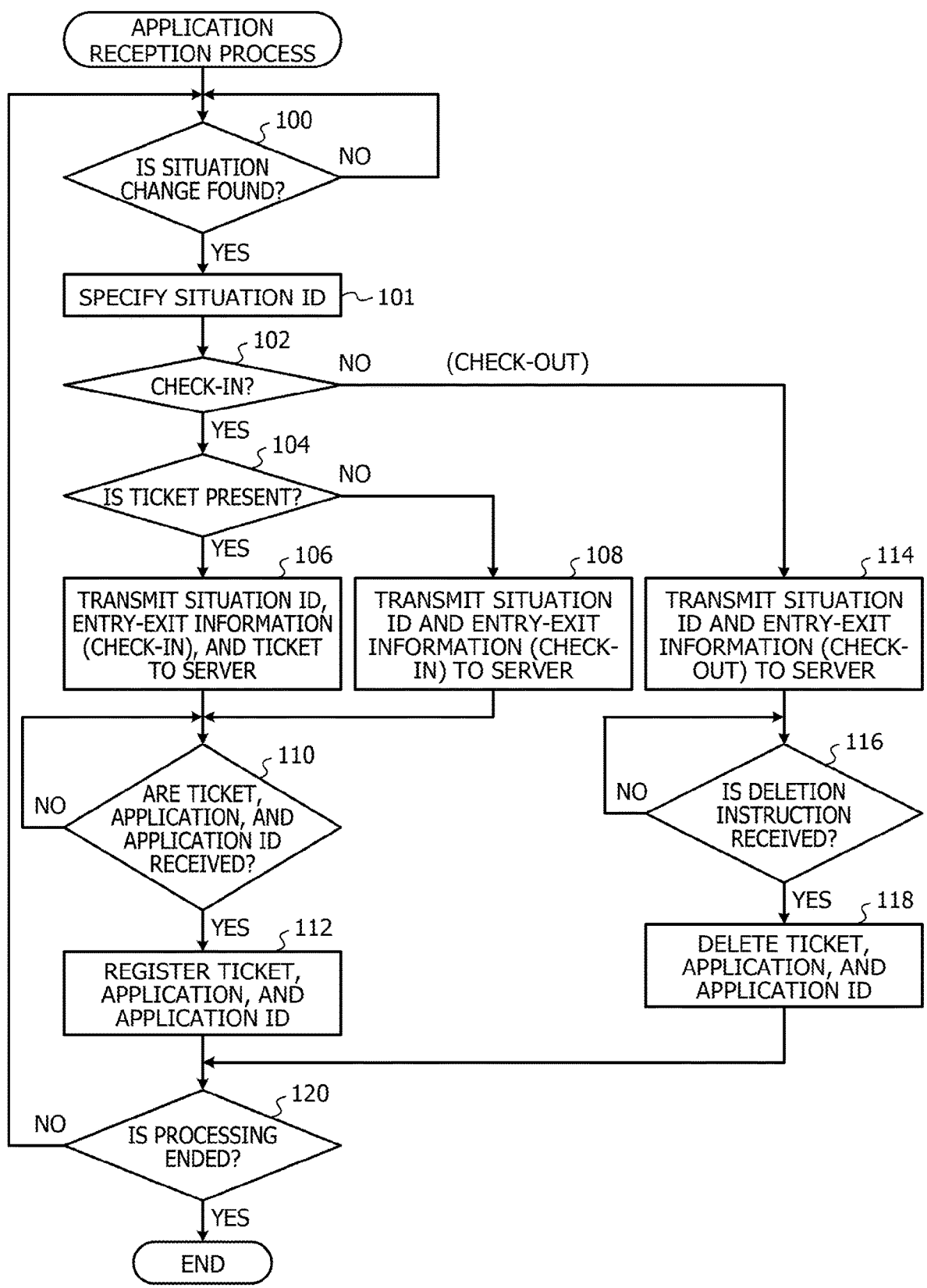
FIG. 9 is a flow chart depicting an example of an application reception process.

Now, action of the present first embodiment is described. It is to be noted that, in the following, description is given of a mode in which a teacher and pupils who belong to a school of a management target participate in a class carried out in a given classroom in the school of the management target (hereinafter referred to as "classroom of the management target"). When the teacher and the pupils enter the school of the management target from respective entrance and exit gates corresponding to them, each of them would cause a terminal 20 owned thereby to execute the application reception processing program 63A to perform an application reception process illustrated in FIG. 9.

At step 100 of the application reception process, the transmission unit 21 waits for reception of a situation notification from any situation notification apparatus 70. Further, if the transmission unit 21 receives a situation notification, then the transmission unit 21 decides whether or not the received situation notification exhibits some change from another situation notification received last, and if an affirmative decision is made, then the processing advances to step 101. At step 101, the transmission unit 21 refers to the situation ID table 88 to specify a situation ID from the received situation notification, whereafter the processing advances to step 102. At step 102, the transmission unit 21 generates entry-exit information and determines whether or not the generated entry-exit information indicates check-in. Then, if an affirmative decision is made at step 102, then the processing advances to step 104.

At step 104, the transmission unit 21 decides whether or not ticket information 72 is stored in the memory 62 (storage unit 23), and if an affirmative decision is made, then the processing advances to step 106. At step 106, the transmission unit 21 transmits the specified situation ID, the generated entry-exit information, and the ticket information 72 stored in the memory 62 to the application distribution server 30A, whereafter the processing advances to step 110.

On the other hand, if a negative decision is made at step 104, then the processing advances to step 108, at which the transmission unit 21 transmits the specified situation ID and the generated entry-exit information to the application distribution server 30A, whereafter the processing advances to step 110.

If the application distribution server 30A receives a situation ID, entry-exit information, and ticket information 72 or a situation ID and entry-exit information from some terminal 20, then the application distribution server 30A transmits an application, an application ID, and ticket information 72 in response to the received information to the terminal 20 of the transmission source.

Thus, at step 110, the reception unit 22 waits for reception of the information of the application, the application ID, and the ticket information 72 transmitted from the application distribution server 30A. If an affirmative decision is made at step 110, then the processing advances to step 112, at which the reception unit 22 stores (registers) the received application, the application ID, and the ticket information 72 into the memory 62. After the process at step 112 is completed, the processing advances to step 120.

On the other hand, if a negative decision is made at step 102, then the transmission unit 21 determines that the generated entry-exit information indicates check-out and advances the processing to step 114, at which the transmission unit 21 transmits the specified situation ID and the generated entry-exit information to the application distribution server 30A. Thereafter, the processing advances to step 116.

If the application distribution server 30A in the present embodiment receives entry-exit information indicative of check-out from a terminal 20, then the application distribution server 30A transmits deletion instruction information for the instruction to remove the application, the application ID, and the ticket information 72 in accordance with the received information from the memory 62 to the terminal 20 of the transmission source.

Therefore, at step 116, the reception unit 22 waits for reception of deletion instruction information transmitted from the application distribution server 30A. If an affirmative decision is made at step 116, then the processing advances to step 118, at which the reception unit 22 deletes (erases) the application, the application ID, and the ticket information 72 indicated by the received deletion instruction information from the memory 62. After the process at step 118 ends, the processing advances to step 120.

At step 120, the reception unit 22 decides whether or not a timing determined in advance as a timing at which the application reception process is to be ended comes. If a negative decision is made, then the processing returns to step 100. However, if an affirmative decision is made, then the application reception process is ended at the point of time. It is to be noted that, although, in the application reception process in the present embodiment, a timing at which instruction inputting for the instruction to end the application reception process is performed by the user is applied as the timing determined in advance as described above, it is a matter of course that the timing is not limited to this.

Figure 10:
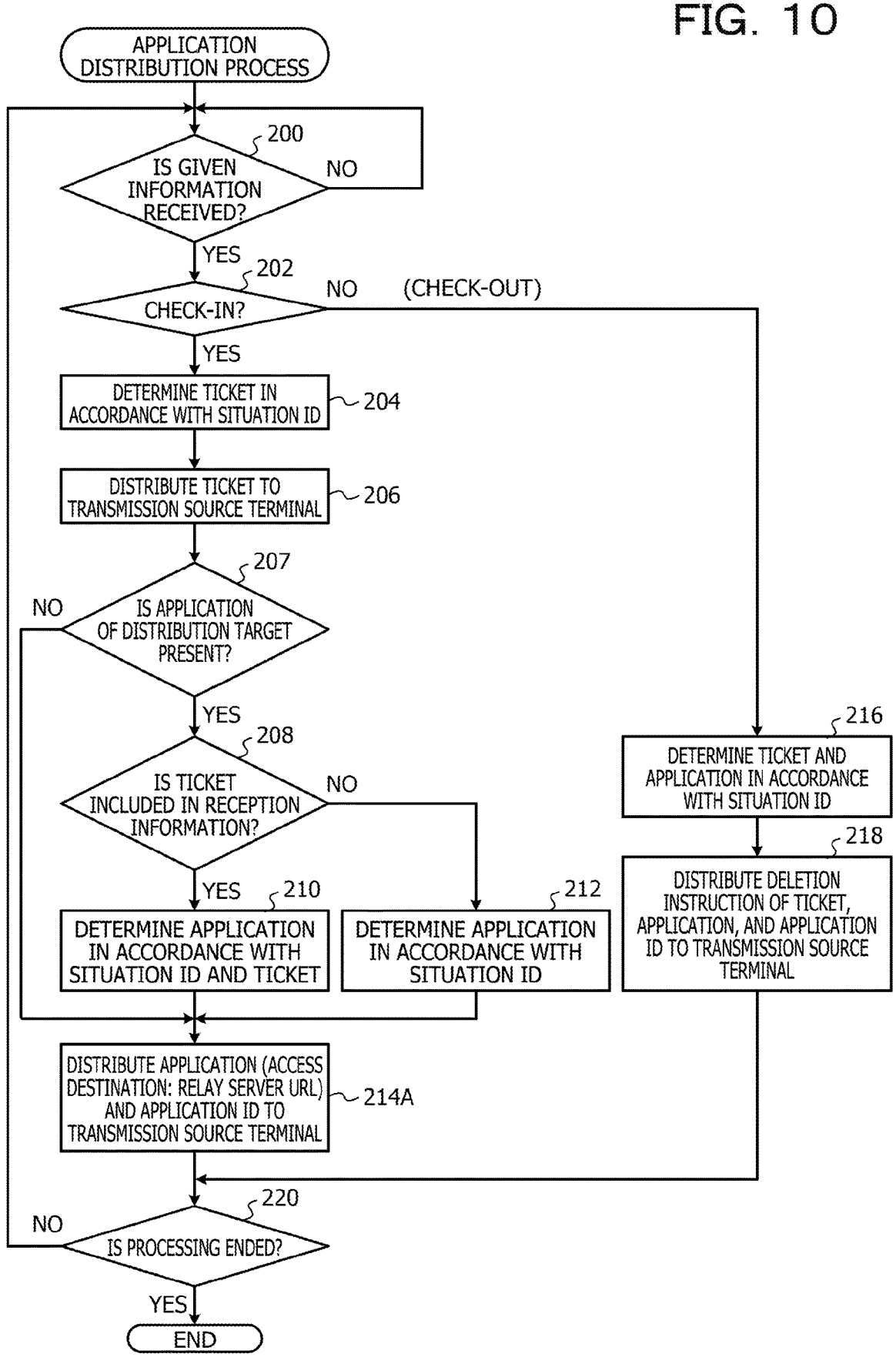
FIG. 10 is a flow chart illustrating an example of an application distribution process according to the first embodiment.

On the other hand, in the computer system 90A in the present embodiment, an application distribution process illustrated in FIG. 10 is performed by the application distribution server 30A that is implemented by the server computer 29A executing the application distribution server program 33A.

At step 200 of the application distribution process, the first reception unit 11 waits for reception of a situation ID, entry-exit information, and ticket information 72 or a situation ID and entry-exit information from any terminal 20. If an affirmative decision is made at step 200, then the processing advances to step 202, at which the first transmission unit 12 determines whether or not the entry-exit information included in the received information indicates check-in. If an affirmative decision is made, then the processing advances to step 204.

At step 204, the first transmission unit 12 refers to the situation ticket table 80 to determine the ticket information 72 corresponding to the situation ID included in the received information. Then at next step 206, the first transmission unit 12 transmits the determined ticket information 72 to the terminal 20 of the transmission source.

Then at next step 207, the first transmission unit 12 searches the demanded ticket table 82 using the situation ID included in the received information as a key to decide whether or not there is an application to be distributed in a situation indicated by the situation ID. If there is an application to be distributed, then the first transmission unit 12 decides that a demanded ticket is registered in an associated relationship with the application in the demanded ticket table 82. If a demanded ticket is registered, then the first transmission unit 12 further decides whether or not the demanded ticket has been received from the terminal 20. When there is no application to be distributed and when the demanded ticket has not been received from the terminal 20 although there is an application to be distributed, an affirmative decision is made at step 207, and the processing advances to step 214A.

On the other hand, when there is an application to be distributed but the demanded ticket is not registered and when there is an application to be distributed and the registered demanded ticket has been received from the terminal 20, an affirmative decision is made at step 207, and the processing advances to step 208. At step 208, the first transmission unit 12 decides whether or not ticket information 72 is included in the information received from the terminal 20, and if an affirmative decision is made, then the processing advances to step 210. At step 210, the first transmission unit 12 refers to the demanded ticket table 82 and the application management table 84A to determine and acquire an application and an application ID corresponding to the ticket information 72 and the situation ID received from the terminal 20. After the process at step 210 is performed, the processing advances to step 214A.

On the other hand, if a negative decision is made at step 208, then the processing advances to step 212. At step 212, the first transmission unit 12 refers to the demanded ticket table 82 and the application management table 84A to determine and acquire an application and an application ID of the application corresponding to the situation ID received from the terminal 20. Thereafter, the processing advances to step 214A.

At step 214A, the first transmission unit 12 transmits the application and the application ID determined and acquired by the process at step 210 or step 212 to the terminal 20 of the transmission source. Thereafter, the processing advances to step 220.

On the other hand, if a negative decision is made at step 202, then the first transmission unit 12 determines that the entry-exit information included in the received information indicates check-out, and the processing advances to step 216. At step 216, the first transmission unit 12 refers to the situation ticket table 80 to determine ticket information 72 of the deletion target in accordance with the received situation ID. Further, the first transmission unit 12 refers to the demanded ticket table 82 and the application management table 84A to determine an application and an application ID of the application of the deletion target in accordance with the received situation ID, whereafter the processing advances to step 218.

At step 218, the first transmission unit 12 transmits deletion instruction information for the instruction to delete the ticket information 72, the application, and the application ID of the deletion target determined by the process at step 216, whereafter the processing advances to step 220.

At step 220, the first transmission unit 12 decides whether or not a timing determined in advance as a timing at which the application distribution process is to be ended comes. If a negative decision is made, then the processing returns to step 200, but if an affirmative decision is made, the application distribution process is ended at this point of time. It is to be noted that, although, in the present embodiment, a timing at which instruction inputting for the instruction to end the application distribution process is performed by the user is applied as the timing determined in advance as described above, the timing is not limited to this.

Incidentally, in the terminal 20 in the present embodiment, an application distributed from the application distribution server 30A and stored in the memory 62 is executed in response to an instruction operation or the like by the user. Here, in the present first embodiment, a URL of the relay server 40 is set as the access destination in the service requesting step in the individual applications. Therefore, if the service requesting step in the application being executed by the terminal 20 is executed, then a service request is transmitted from the transmission unit 21 to the relay server 40 together with the application ID and the ticket information.

Figure 11:
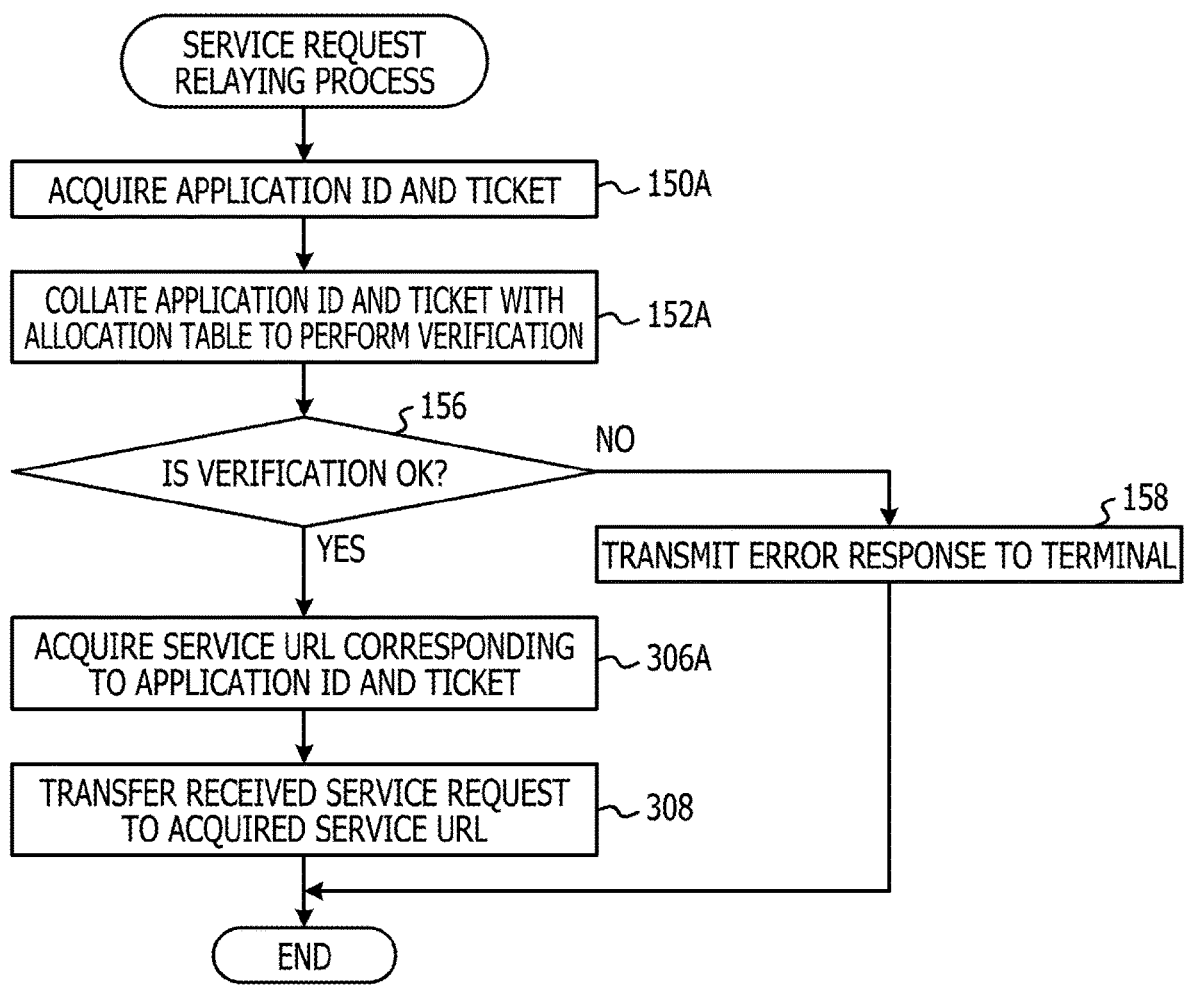
FIG. 11 is a flow chart illustrating an example of a service request relaying process.

The relay server 40 implemented by the server computer 29A executing the relay server program 43A performs a service request relaying process illustrated in FIG. 11.

At step 150A of the service request relaying process, the second reception unit 13 waits that a service request, an application ID, and ticket information 72 are received from any terminal 20. Then, if the information mentioned is received from any terminal 20, then the second reception unit 13 passes the received application ID and the ticket information 72 to the verification unit 14, whereafter the processing advances to step 152A.

At step 152A, the verification unit 14 verifies whether or not the combination of the application ID and the ticket information 72 passed from the second reception unit 13 are registered in the allocation table 86A, namely, whether or not the received service request is a legitimate service request. At next step 156, the verification unit 14 verifies whether or not the received service request is a legitimate request, and if an affirmative decision is made, then the processing advances to step 306A.

At step 306A, the determination unit 15 reads out a service URL corresponding to the combination of the received application ID and the ticket information 72 from the allocation table 86A to acquire the service URL. Then at next step 308, the controller 16 transfers the received service request from the terminal 20 to the service URL acquired by the determination unit 15.

In the service providing server 50A that has received the service request transferred (relayed) thereto by the relay server 40, the service processing program data 52A to which the service URL described above is allotted is accessed. Consequently, a program included in the accessed service processing program data 52A is executed, and the service processor 52B thereby performs a process for providing the requested service to the terminal 20.

Here, the individual service processing program data 52A stored in the storage unit 19 of the service providing server 50A are different from each other at least in one of the type of a service to be provided and the situation of the corresponding terminal 20. Since the service URL is selected from the combination of the application ID and the ticket information 72, the service processing program data 52A that provides a service corresponding to the type of the application from which the service request has been transmitted and the situation of the terminal 20 at present is accessed. Consequently, the developer of the service processing program data 52A need not incorporate a function for detecting a situation of the terminal 20 and switching the contents of a service to be provided in response to the detected situation into the service processing program data 52A. Accordingly, the man-hour and the cost for development of the service processing program data 52A are reduced.

For example, a plurality of service processing program data 52A that provide a projector service are set such that, in accordance with a service request from the projector application, they control operation of the projectors provided at places different from each other. Further, to a plurality of service processing program data 52A that provide a projector service, service URLs different from each other are allotted.

Then, for example, if a service request is transmitted from the projector application of a terminal 20 positioned in a classroom, then a program of a service processing program data 52A for providing a projector service for controlling operation of a projector installed in the classroom is executed. Further, if a service request is transmitted from a projector application of a terminal 20 positioned in a science laboratory, then a program of a service processing program data 52A for providing a projector service for controlling operation of a projector installed in the science laboratory is executed. Accordingly, the necessity to incorporate a function for detecting a situation of a terminal 20 and switching contents of a service to be provided in response to the detected situation in the individual service processing program data 52A can be reduced.

On the other hand, if a negative decision is made at step 156, then the processing advances to step 158, at which the verification unit 14 transmits an error response to the terminal 20 of the access source and then ends the service request relaying process. In this case, the service requested by transmitting a service request from the terminal 20 is not provided to the terminal 20. Further, while, in the terminal 20 receiving the error response, a process for displaying, for example, a message or the like for the notification that an error has occurred on the display unit 65 is performed, some other process may be applied.

Figure 12:
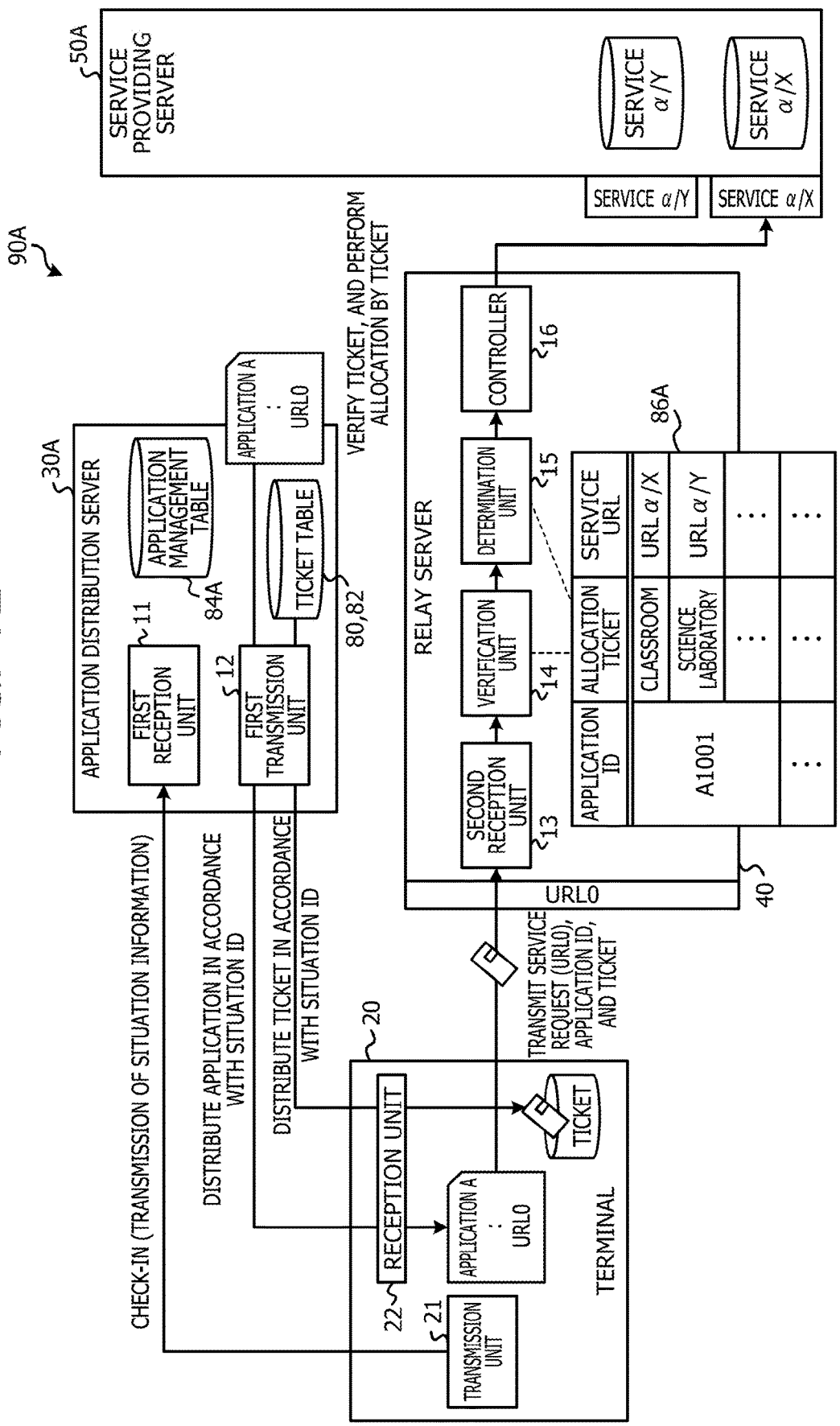
FIG. 12 is a schematic view illustrating an example of a flow of entire processing in the first embodiment.

Now, a flow of an entire process when some terminal checks in to some place is described with reference to FIG. 12. The terminal illustrated in FIG. 12 may be the terminal 20 illustrated in FIG. 1. If the terminal 20 checks in to some place, then situation information including a situation ID representative of a situation regarding the place at which the check-in is performed and entry-exit information indicative of the check-in is transmitted to the application distribution server 30A by the transmission unit 21.

The application distribution server 30A receives the situation information transmitted from the terminal 20 by the first reception unit 11 thereof. Then, the first transmission unit 12 of the application distribution server 30A acquires ticket information associated with a situation ID included in the received situation information from the situation ticket table 80 and transmits the acquired ticket information to the terminal 20. The application ID of an application that corresponds to the received situation ID and does not demand ticket information is sometimes registered in the demanded ticket table 82. In this case, the first transmission unit 12 acquires an application body of the application ID registered in the demanded ticket table 82 from the application management table 84A and transmits the acquired application to the terminal 20 together with the application ID.

The terminal 20 receives the ticket information transmitted from the application distribution server 30A by the reception unit 22 and stores the ticket information into the memory 62. Further, if an application and an application ID are transmitted from the application distribution server 30A, then the terminal 20 receives the application and the application ID transmitted from the application distribution server 30A by the reception unit 22 and stores the application and the application ID into the memory 62.

Thereafter, if the terminal 20 checks in to a new place, then the terminal 20 transmits, by the transmission unit 21 thereof, situation information including a situation ID indicating a situation relating to the check-in place and entry-exit information indicative of the check-in and the ticket information registered already therein to the application distribution server 30A.

In this case, the application distribution server 30A receives the situation information including the situation ID and the entry-exit information and the ticket information transmitted from the terminal 20 by the first reception unit 11. Then, the first transmission unit 12 of the application distribution server 30A acquires ticket information corresponding to the received situation ID from the situation ticket table 80 and transmits the acquired ticket information to the terminal 20. Consequently, the terminal 20 receives the ticket information transmitted from the application distribution server 30A by the reception unit 22 and stores the ticket information into the memory 62.

It is to be noted that, in the application distribution server 30A, the application ID of an application corresponding to the combination of the received situation ID and the ticket information is sometimes registered in the demanded ticket table 82. In this case, the first transmission unit 12 of the application distribution server 30A acquires the application body from the application management table 84A on the basis of the application ID and transmits the acquired application to the terminal 20 together with the application ID. Consequently, the terminal 20 receives the application and the application ID transmitted from the application distribution server 30A by the reception unit 22 and stores the application and the application ID into the memory 62.

Thereafter, the application stored into the memory 62 by the terminal 20 is executed suitably in response to an instruction input or the like from the user of the terminal 20. As described hereinabove, in the present first embodiment, the URL of the relay server 40 (in the example depicted in FIG. 12, "URL0") is set as an access destination in the service requesting step in the individual applications. Therefore, if the service requesting step in the application being executed by the terminal 20 is executed, then a service request is transmitted to the relay server 40 together with the application ID and the ticket information 72 by the transmission unit 21. It is be noted that, in the present first embodiment, the relay server 40 is an example of the first access destination and the URL (URL0) of the relay server 40 is an example of the access destination information indicative of the first access destination.

The second reception unit 13 of the relay server 40 receives the service request, the application ID, and the ticket information 72 transmitted from the terminal 20. The verification unit 14 of the relay server 40 verifies whether or not the combination of the application ID and the ticket information 72 received from the terminal 20 is registered in the allocation table 86A. If the combination of the received application ID and the ticket information 72 is registered in the allocation table 86A, then the determination unit 15 of the relay server 40 acquires a service URL corresponding to the combination of the received application ID and the ticket information 72 from the allocation table 86A. Then, the controller 16 of the relay server 40 transfers the service request received from the terminal 20 to the service URL.

In the service providing server 50A that receives the service request transferred (relayed) by the relay server 40, the service processing program data 52A to which the service URL described above is allotted is accessed. Consequently, a program included in the accessed service processing program data 52A is executed to cause the service processor 52B to perform a process for providing the requested service to the terminal 20.

In this manner, in the present first embodiment, service URLs different from each other are allotted to a plurality of service processing program data 52A. Further, the service URL of the service processing program data 52A that corresponds to a situation of a terminal 20 indicated by ticket information received from the terminal 20 is determined. Then, a service request transmitted by the terminal 20 by execution of a service requesting step included in an application by the terminal 20 is transferred to the determined service URL. This makes it possible not to incorporate a function for detecting a situation of a terminal 20 and switching the access destination or process contents into an application and a service processing program data 52A, and switching of a service to be provided in response to a situation of a terminal 20 can be implemented by a simple and easy configuration. Further, also the development manhour and cost of an application and the service processing program data 52A can be reduced.

Further, in the present first embodiment, a plurality of service processing program data 52A are different from each other at least in type of a service to be provided and corresponding situation of a terminal 20. Further, an application in which the relay server 40 that accepts a service request irrespective of the type of the service is set as an access destination in the service requesting step is transmitted to the terminal 20. Then, when a service request, ticket information, and an application ID destined for the relay server 40 are received from the terminal 20, a service URL is determined on the basis of the received information. Consequently, the access destination to be set in the service requesting step included in applications can be set uniformly to the relay server, and the development load of the applications can be reduced further.

Further, in the present first embodiment, an application selected in response to a situation of the terminal 20 indicated by situation information received from the terminal 20 is transmitted to the terminal 20. Consequently, the user of the terminal 20 can save the labor for the selection of an application in response to the situation of the terminal 20, and the operability of the terminal 20 can be improved.

Further, in the present first embodiment, ticket information corresponding to a situation in which an application being executed in a terminal 20 transmits a service request is registered in the allocation table 86A in an associated relationship with the application ID of the application. Then, if a service request, ticket information, and an application are received from the terminal 20, then the combination of the application ID and the ticket information is collated with the allocation table 86A to verify whether or not the received service request is legitimate. Consequently, a service request that is not legitimate can be excluded, and the toughness as the computer system can be improved.

Second Embodiment

Now, a second embodiment of the disclosed technology is described. It is to be noted that like elements to those of the first embodiment are denoted by like reference symbols, and overlapping description of them is omitted herein.

Figure 13:
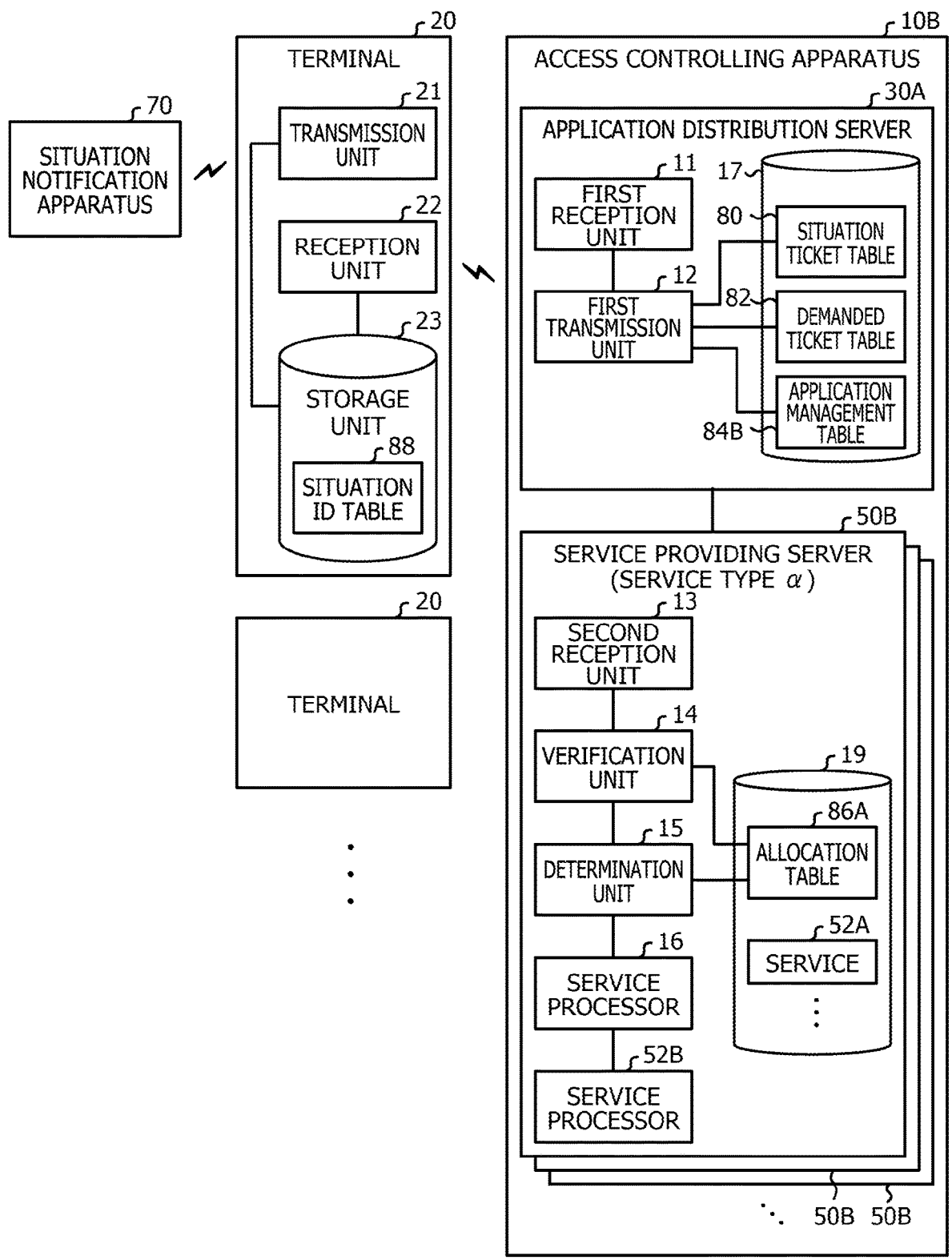
FIG. 13 is a functional block diagram of an access controlling apparatus and terminals according to a second embodiment.

FIG. 13 depicts an access controlling apparatus and a plurality of terminals according to the present second embodiment. An access controlling apparatus 10B is different from the access controlling apparatus 10A described hereinabove in connection with the first embodiment in that the access controlling apparatus 10B does not include the relay server 40 but includes a plurality of service providing servers 50B that perform a process for providing plurality of services different in type from each other.

The individual service providing servers 50B have URLs (service type URLs) of different types allotted thereto. In a storage unit 19 of each of the service providing servers 50B, service processing program data 52A for providing a service of a type corresponding to each service providing server 50B is stored. The individual service processing program data 52A have service URLs different from each other and allotted thereto similarly as in the first embodiment. Further, each of the service providing servers 50B includes a second reception unit 13, a verification unit 14, a determination unit 15, a controller 16, and a service processor 52B. The second reception unit 13, the verification unit 14, the determination unit 15, and the controller 16 have functions approximately same as those in the first embodiment, and overlapping description of them is omitted herein.

Further, the present second embodiment is different from the first embodiment also in that the storage unit 17 of the application distribution server 30A has an application management table 84B stored therein in place of the application management table 84A described hereinabove in connection with the first embodiment. FIG. 15 is a view illustrating an example of an application management table. The application management table illustrated in FIG. 15 may be the application management table 84B illustrated in FIG. 13. As depicted in FIG. 15, the application management table 84B is similar to the application management table 84A in that application IDs and (program bodies of) applications are registered in an associated relationship with each other therein. However, in the (program bodies of the) individual applications registered in the application management table 84B, service type URLs of the service providing servers 50B corresponding the types of services to be requested are individually set as access destinations in the service requesting steps. In FIG. 15, examples of the service type URL are indicated as "URLα" and "URLβ."

Figure 14:
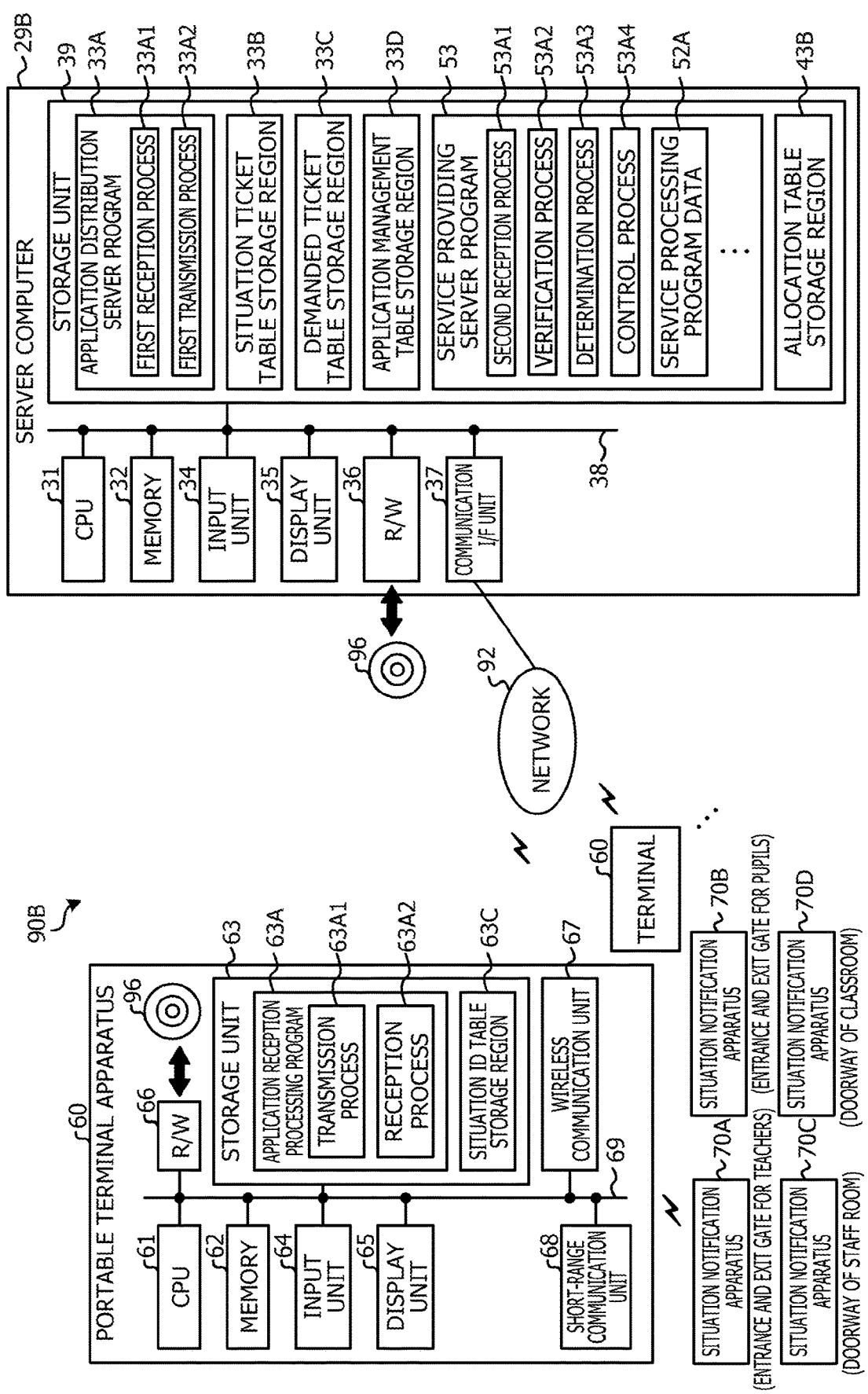
FIG. 14 is a schematic block diagram of a computer system according to the second embodiment.

FIG. 14 is a schematic block diagram of a computer system. The access controlling apparatus 10B described above can be implemented by a server computer 29B included in a computer system 90B depicted in FIG. 14. In a storage unit 39 of the server computer 29B, an application distribution server program 33A and a service providing server program 53 are stored. It is to be noted that the service providing server program 53 is a program for causing the server computer 29B to function as the service providing server 50B.

A CPU 31 of the server computer 29B reads out the service providing server program 53 from the storage unit 39 and develops the service providing server program 53 in a memory 32 and then successively executes processes the service providing server program 53 has. The service providing server program 53 includes a second reception process 53A1, a verification process 53A2, a determination process 53A3, and a control process 53A4 and further includes a plurality of service processing program data 52A. The CPU 31 operates as the second reception unit 13 depicted in FIG. 13 by executing the second reception process 53A1. Further, the CPU 31 operates as the verification unit 14 depicted in FIG. 13 by executing the verification process 53A2. Further, the CPU 31 operates as the determination unit 15 depicted in FIG. 13 by executing the determination process 53A3. Furthermore, the CPU 31 operates as the controller 16 depicted in FIG. 13 by executing the control process 53A4. Consequently, the server computer 29B that executes the service providing server program 53 functions as the service providing server 50B depicted in FIG. 13.

Figure 16:
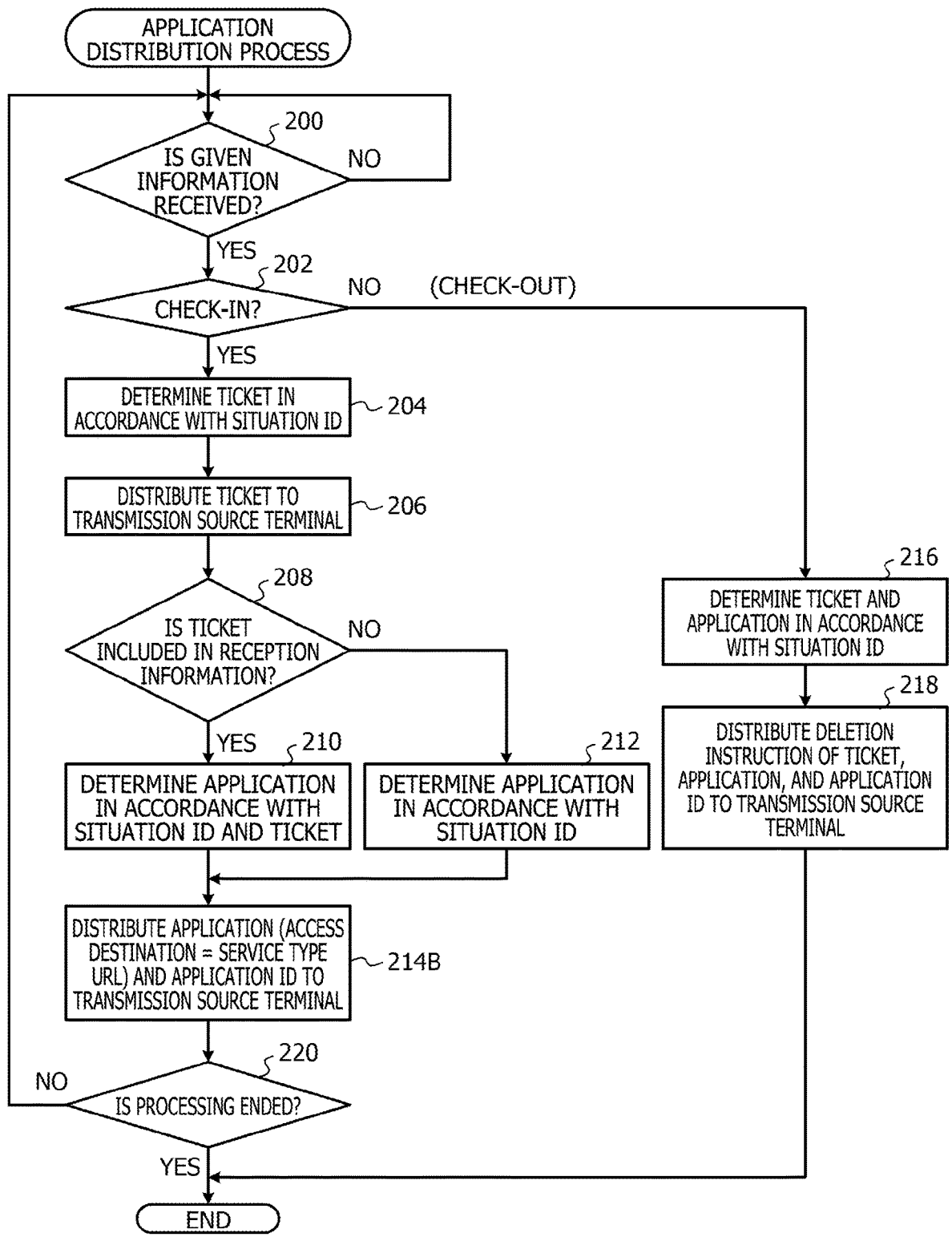
FIG. 16 is a flow chart illustrating an example of an application distribution process according to the second embodiment.

Now, as action of the present second embodiment, an application distribution process executed by an application distribution server is described first with reference to FIG. 16. The application distribution server described with reference to FIG. 16 may be the application distribution server 30A illustrated in FIG. 13. In the application distribution process (FIG. 10) described hereinabove in connection with the first embodiment, an application in which the URL of the relay server 40 is set as an access destination in the service requesting step is distributed to a terminal 20 at step 214A. In contrast, the application distribution process in the present second embodiment is different only in that an application in which a service type URL corresponding to a type of a service to be requested is set as the access destination in the service requesting step is distributed to a terminal 20 at step 214B.

Figure 17:
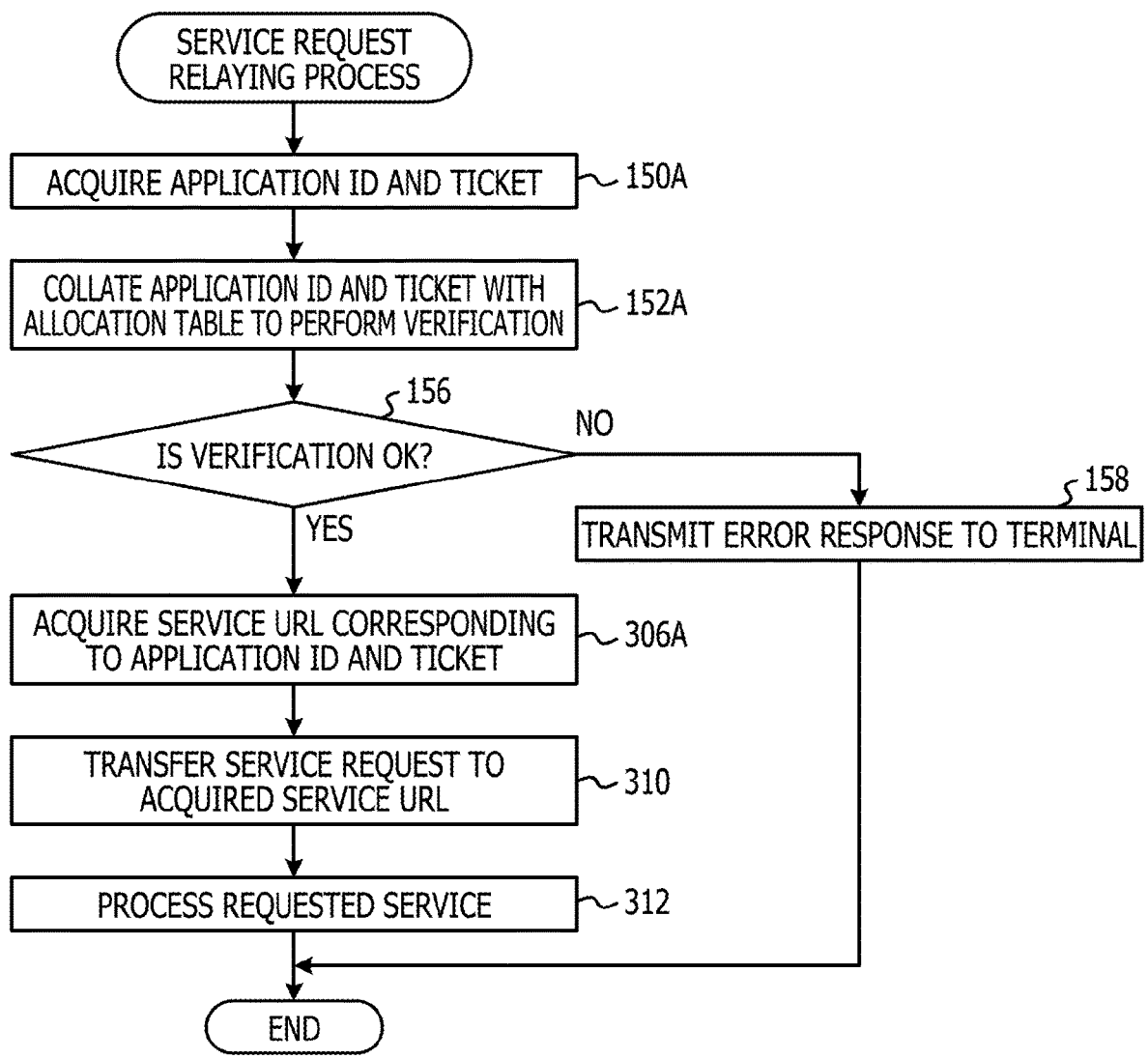
FIG. 17 is a flow chart illustrating an example of a service request reception process in the second embodiment.

Now, a service request reception process executed by a service providing server in the present second embodiment is described in regard only to a portion thereof different from that of the service request relay process (FIG. 11) described hereinabove in connection with the first embodiment with reference to FIG. 17. The service providing server described with reference to FIG. 17 may be the service providing server 50B illustrated in FIG. 13. In the service request relaying process (FIG. 11) described hereinabove in connection with the first embodiment, the controller 16 transfers a service request received from a terminal 20 to a service URL acquired by the determination unit 15 at step 308.

In the service request reception process in the present second embodiment, at step 310, the controller 16 transfers a service request received from a terminal 20 to a service URL acquired by the determination unit 15 in place of step 308 described above. However, in the present second embodiment, the transfer destination of the service request at step 310 is the service processing program data 52A stored in the storage unit 19 of the same service providing server program 53. Accordingly, the transfer of the service request described above can be implemented, different from the transmission of an HTTP request in the first embodiment, by a process of calling the service processing program data 52A to which the service URL acquired by the determination unit 15 is allotted.

As a result of the transfer of the service request described above, a program included in the service processing program data 52A to which the service URL acquired by the determination unit 15 is allotted is executed and a service requested by the service processor 52B is processed at next step 312.

Figure 18:
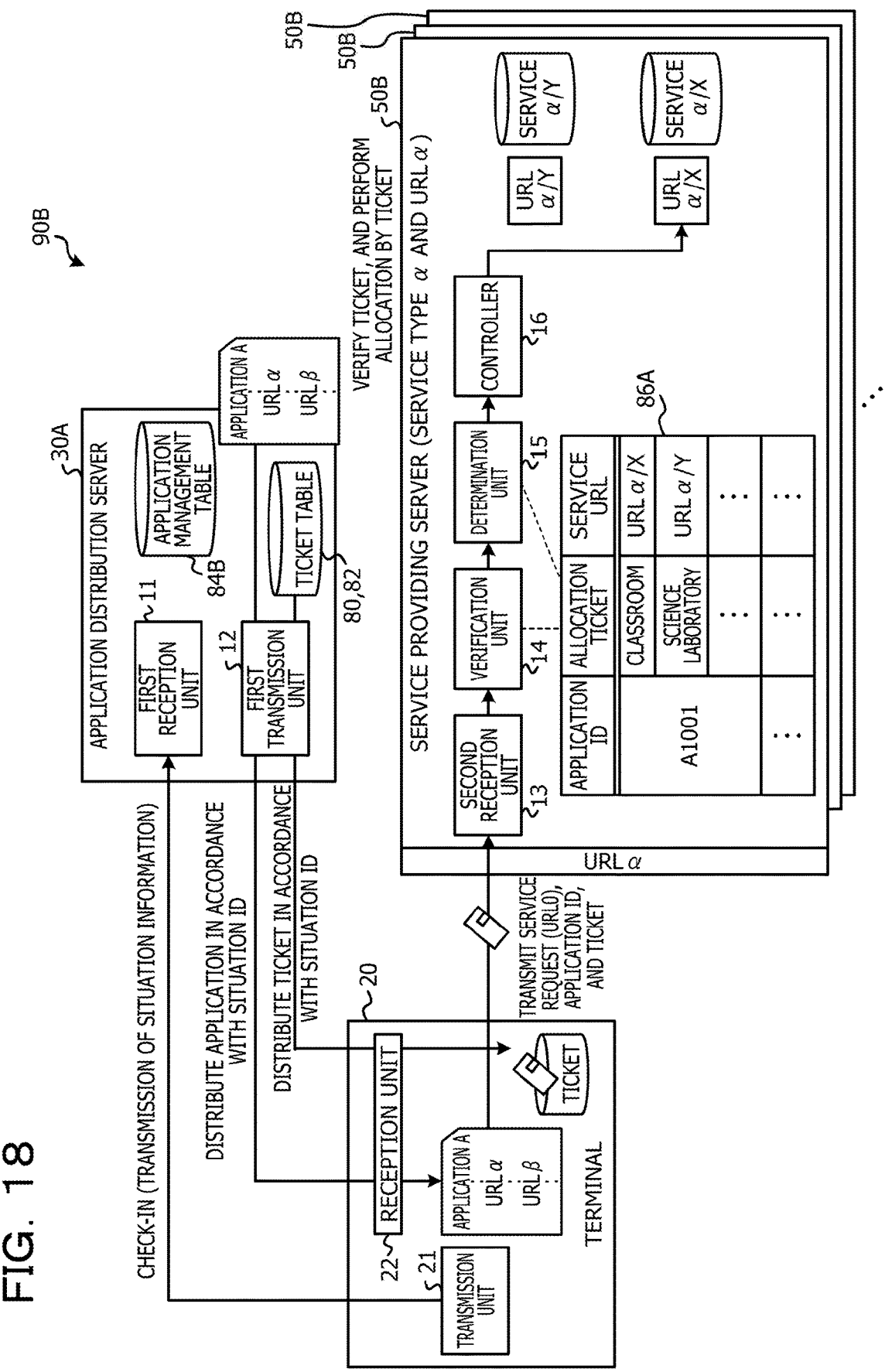
FIG. 18 is a schematic view illustrating an example of a flow of entire processing in the second embodiment.

Now, description is given of a flow of a portion of the flow of the entire process in the present second embodiment with reference to FIG. 18, which is different from the flow (FIG. 12) of the entire process described in connection with the first embodiment, namely, of a portion later than the execution of the application by a terminal. The terminal illustrated in FIG. 18 may be the terminal 20 illustrated in FIG. 13.

An application distributed from the application distribution server 30A to a terminal 20 is stored into the memory 62 once and then is suitably executed in response to an instruction input or the like from the user of the terminal 20. As described hereinabove, in the present second embodiment, a service type URL (in the example depicted in FIG. 18, "URLα" or "URLβ") corresponding to a type of a service to be requested is set as an access destination in the service requesting step in each of the applications. Therefore, if the service requesting step in the application being executed by the terminal 20 is executed, then a service request is transmitted together with an application ID and ticket information 72 to the service providing server 50B corresponding to the type of the requested service by the transmission unit 21. It is to be noted that, in the present second embodiment, the service providing server 50B is an example of the second access destination, and the service type URL (URLα or URLβ) is an example of the access destination information indicative of the second access destination.

The second reception unit 13 of the service providing server 50B receives the service request, the application ID, and the ticket information 72 transmitted from the terminal 20. The verification unit 14 of the service providing server 50B verifies whether or not the combination of the application ID and the ticket information 72 received from the terminal 20 is registered in an allocation table 86A. If the combination of the application ID and the ticket information 72 is registered in the allocation table 86A, then the determination unit 15 of the service providing server 50B acquires a service URL corresponding to the combination of the received application ID and ticket information 72 from the allocation table 86A. Then, the controller 16 of the service providing server 50B transfers the service request received from the terminal 20 to the service URL.

By the transfer of the service request described above, service processing program data 52A that provides a service of a type corresponding to the service type URL set in advance and corresponds to the application ID and the ticket information 72 is accessed. Thereby, since a program included in the accessed service processing program data 52A is executed, a process for providing the requested service to the terminal 20 is performed by the service processor 52B.

In this manner, also in the present second embodiment, service URLs different from each other are allotted to a plurality of service processing program data 52A. Further, a service URL of the service processing program data 52A corresponding to the situation of the terminal 20 indicated by ticket information received from the terminal 20 is determined. Then, the service requesting step included in the application is executed by the terminal 20 to transfer the service request transmitted from the terminal 20 to the determined service URL. This makes it possible not to incorporate a function for detecting a situation of a terminal 20 and switching the access destination or process contents into an application and a service processing program data 52A, and switching of a service to be provided in response to a situation of a terminal 20 can be implemented by a simple and easy configuration. Further, also the development man-hour and cost of an application and the service processing program data 52A can be reduced.

Further, in the present second embodiment, a plurality of service processing program data 52A are different from each other at least in type of a service to be provided and corresponding situation of a terminal 20. Further, an application in which the service providing server 50B corresponding to a type of a requested service is set as an access destination in the service requesting step is transmitted to the terminal 20. Then, when a service request, ticket information, and an application ID destined for the service providing server 50B are received from the terminal 20, a service URL is determined on the basis of the received information.

In this case, since a service type URL is set as the access destination to the service requesting step included in the application, in comparison with the first embodiment in which access destinations can be set to the relay server in the same way, the development load of the application increases. However, even if the application and the situation of the terminal 20 are fixed, it is made possible to receive provision of a plurality of types of services by describing a plurality of service requesting steps in the application and making the service type URLs to be set as an access destination in the steps different from each other. Accordingly, since a plurality of services can be utilized in a state in which the application and the situation of the terminal 20 are fixed, more various processes can be implemented.

It is to be noted that the other working effects are similar to those of the first embodiment, and therefore, description of the working effects is omitted.

Third Embodiment

In the following, a third embodiment of the disclosed technology is described. It is to be noted that like elements to those in the second embodiment are denoted by like reference symbols, and overlapping description of them is omitted herein.

Figure 19:
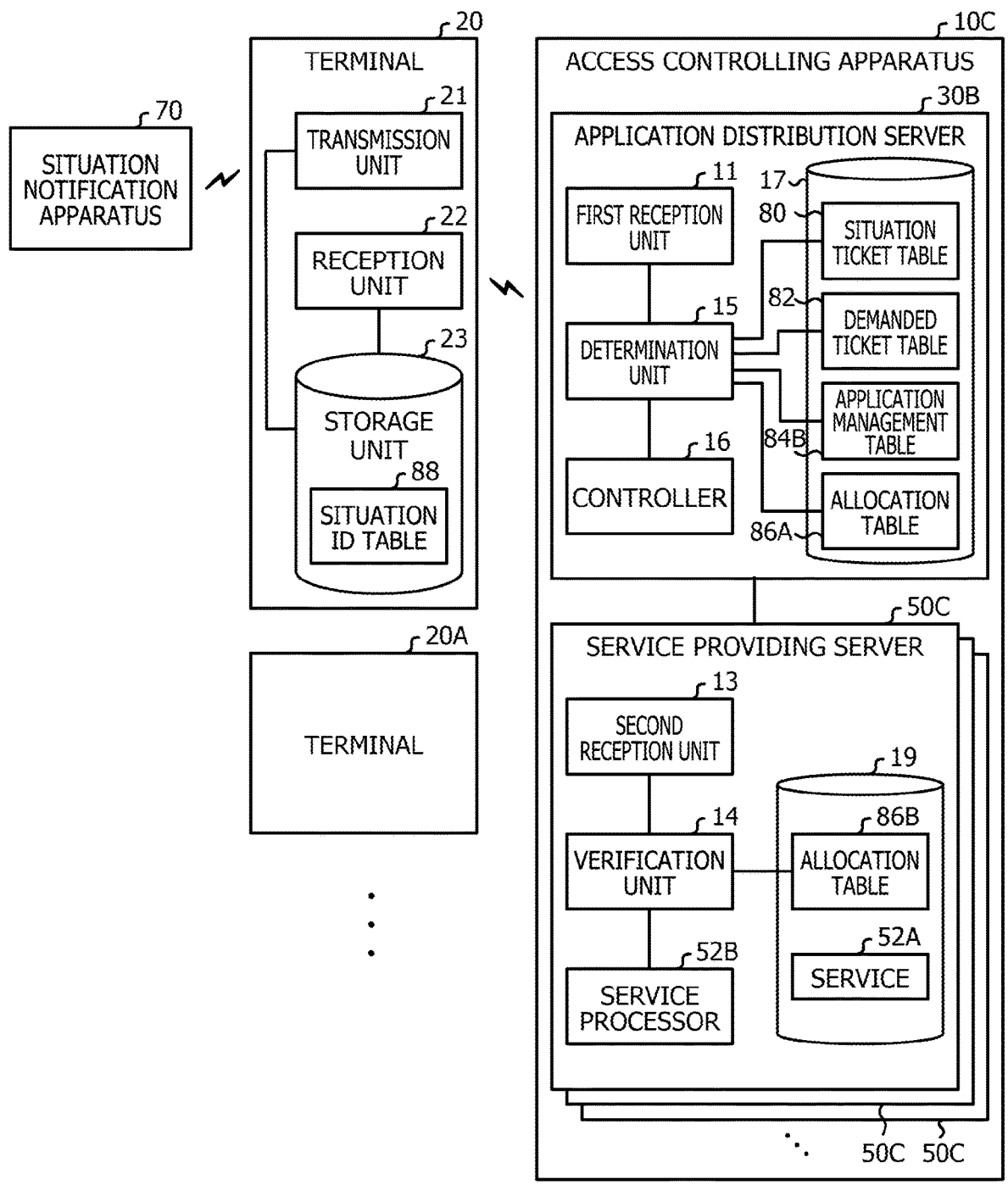
FIG. 19 is a functional block diagram of an access controlling apparatus and terminals according to a third embodiment.

FIG. 19 depicts an access controlling apparatus and a plurality of terminals according to the present third embodiment. An access controlling apparatus 10C is different from the access controlling apparatus 10B described hereinabove in connection with the second embodiment in that an application distribution server 30B is provided in place of the application distribution server 30A. The application distribution server 30B includes a first reception unit 11, a determination unit 15, and a controller 16, and an allocation table 86A is stored in a storage unit 17. It is to be noted that functions of the determination unit 15 and the controller 16 are similar to those in the second embodiment, and therefore, overlapping description of them is omitted herein.

Further, the present third embodiment is different from the second embodiment also in that a plurality of service providing servers 50C that are different in at least one of the type of a corresponding service and the situation of the corresponding terminal 20 are provided in place of the service providing servers 50B. In the individual service providing servers 50C, service URLs different from each other are allotted. In each of storage units 19 of the individual service providing servers 50C, single service processing program data 52A corresponding to the individual service providing server 50C is stored. Further, each of the service providing servers 50C includes a second reception unit 13 and a verification unit 14.

Figure 23:
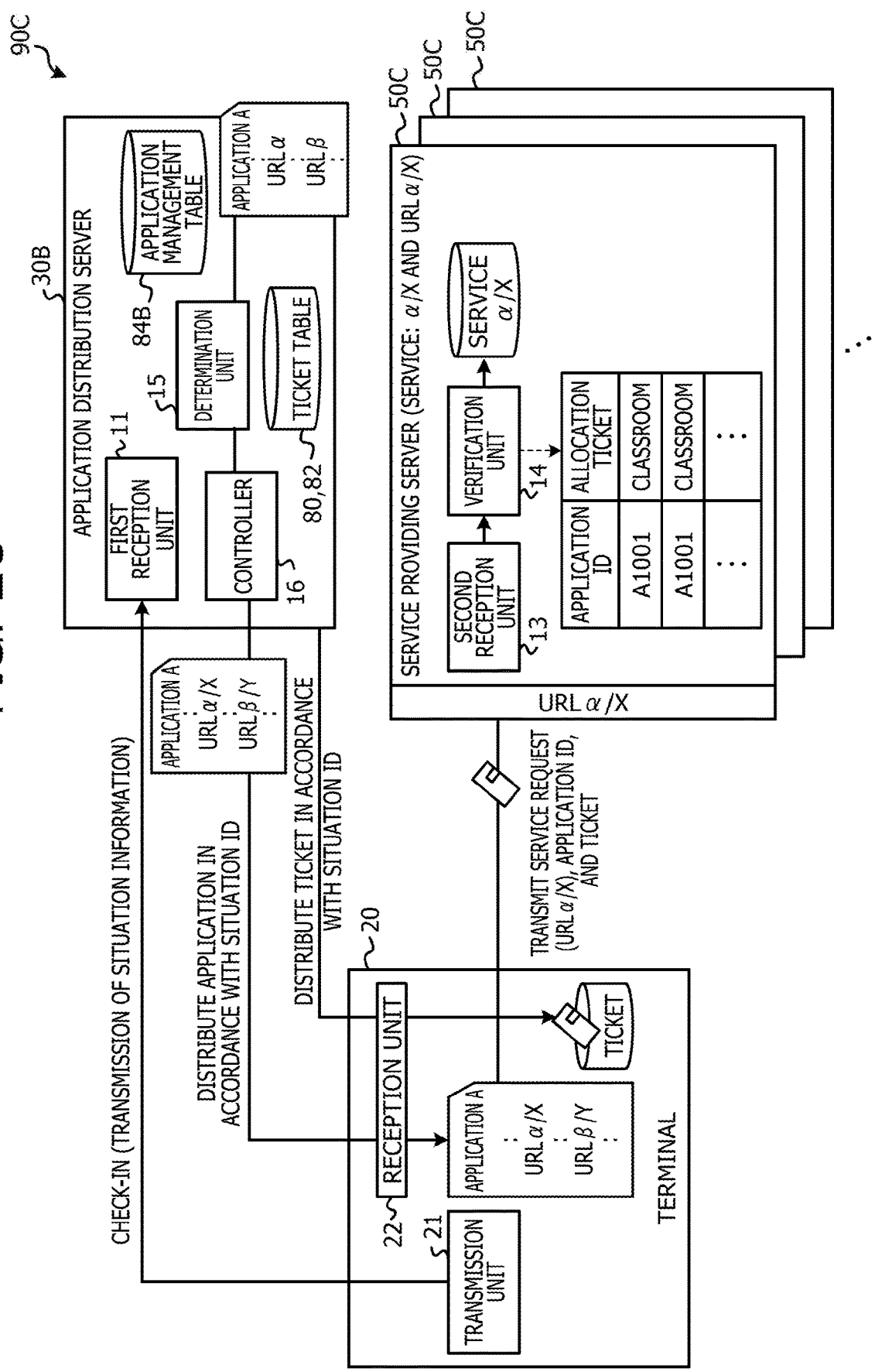
FIG. 23 is a schematic view illustrating an example of a flow of entire processing in the third embodiment.

Further, the present third embodiment is different from the second embodiment also in that the storage unit 19 of the service providing server 50C stores therein an allocation table 86B in place of the allocation table 86A described hereinabove in connection with the first embodiment. As an example, as depicted in FIG. 23, an allocation table has application IDs and allocation tickets registered therein in an associated relationship with each other, but service URLs are not registered.

Figure 20:
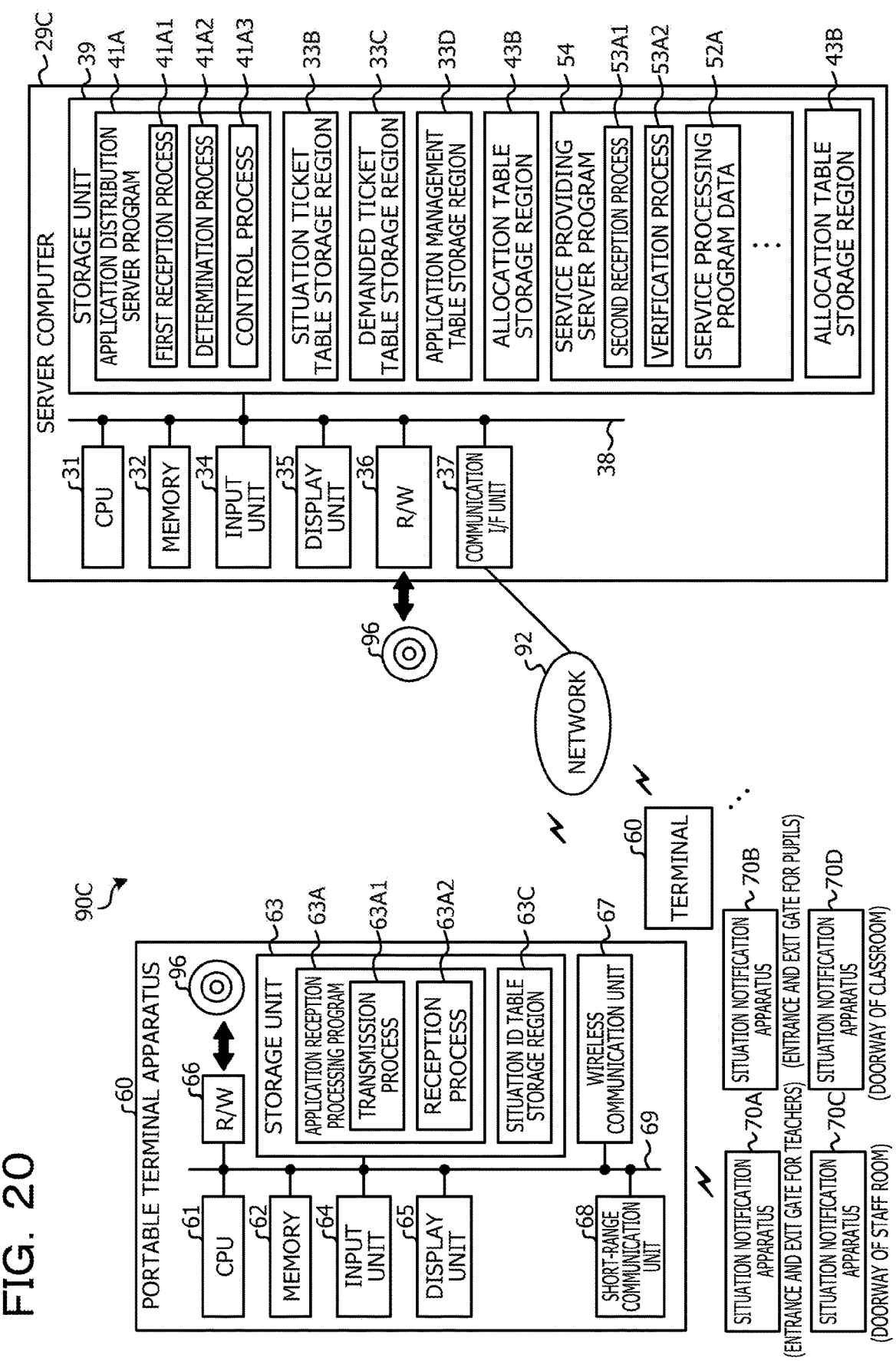
FIG. 20 is a schematic block diagram of a computer system according to the third embodiment.

FIG. 20 is a schematic block diagram of a computer system. The access controlling apparatus 10C described above can be implemented by a server computer 29C included in a computer system 90C depicted in FIG. 20. A storage unit 39 of the server computer 29C has an application distribution server program 41A and a service providing server program 54 stored therein.

A CPU 31 of the server computer 29C reads out the application distribution server program 41A from the storage unit 39 and develops the application distribution server program 41A in a memory 32 and then successively executes processes the application distribution server program 41A has. The application distribution server program 41A includes a first reception process 41A1, a determination process 41A2, and a control process 41A3. The CPU 31 operates as the first reception unit 11 depicted in FIG. 19 by executing the first reception process 41A1. Further, the CPU 31 operates as the determination unit 15 depicted in FIG. 19 by executing the determination process 41A2. Further, the CPU 31 operates as the controller 16 depicted in FIG. 19 by executing the control process 41A3. Consequently, the server computer 29C that executes the application distribution server program 41A functions as the application distribution server 30B depicted in FIG. 19.

Further, the CPU 31 of the server computer 29C reads out the service providing server program 54 from the storage unit 39 and develops the service providing server program 54 in the memory 32 and then successively executes processes the service providing server program 54 has. The service providing server program 54 includes a second reception process 54A1 and a verification process 54A2 and further includes a plurality of service processing program data 52A. The CPU 31 operates as the second reception unit 13 depicted in FIG. 19 by executing the second reception process 54A1. Further, the CPU 31 operates as the verification unit 14 depicted in FIG. 19 by executing the verification process 54A2. Consequently, the server computer 29C that executes the service providing server program 54 functions as the service providing server 50C depicted in FIG. 19.

Figure 21:
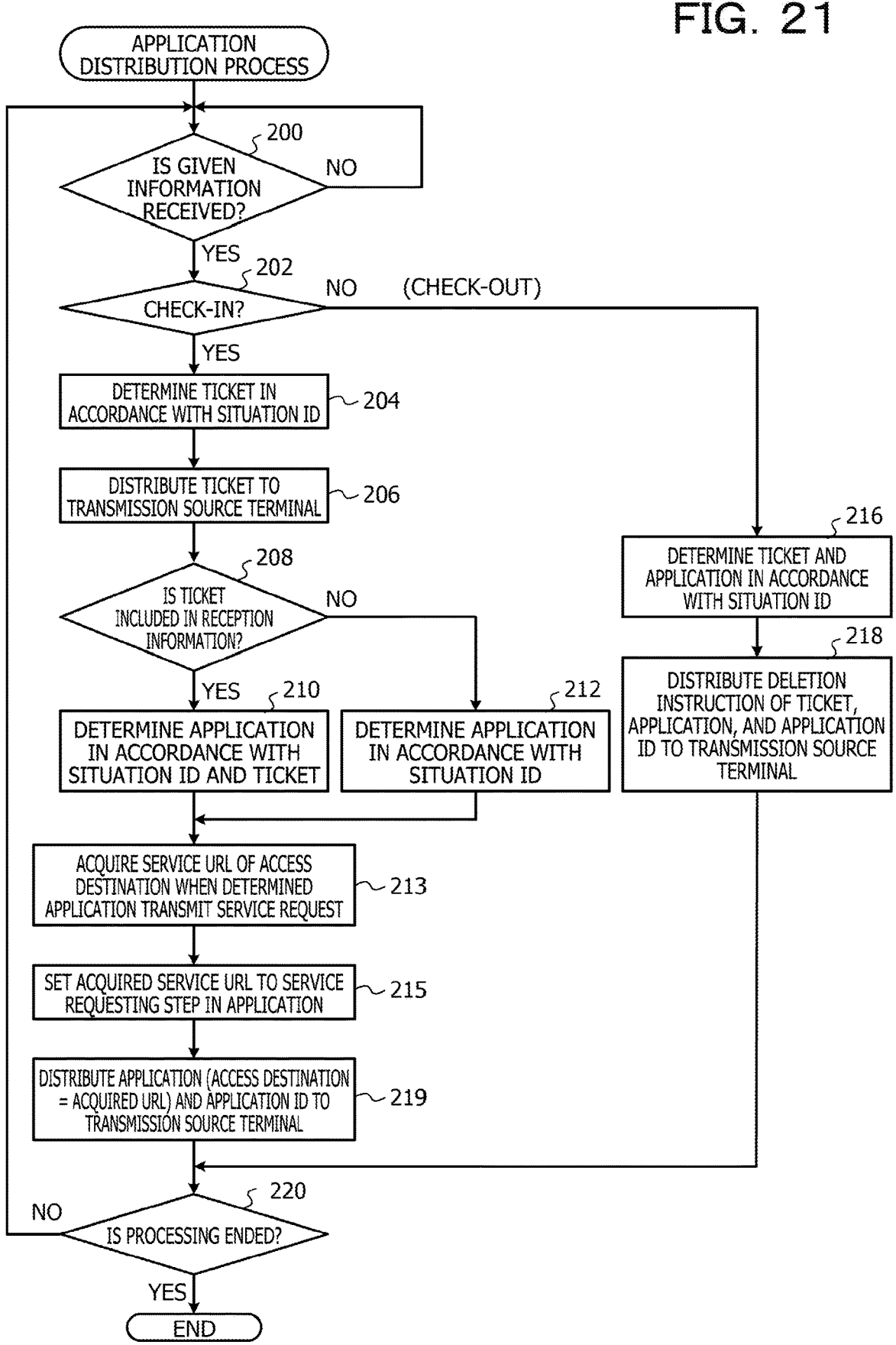
FIG. 21 is a flow chart illustrating an example of an application distribution process according to the third embodiment.

Now, as action of the present third embodiment, an application distribution process executed by an application distribution server is described first with reference to FIG. 21 only in regard to a portion thereof which is different from that of the application distribution process (FIG. 16) described hereinabove in connection with the second embodiment. The application distribution server described with reference to FIG. 21 may be the application distribution server 30B illustrated in FIG. 19. In the application distribution process in the present third embodiment, processes at steps 213, 215, and 219 hereinafter described are executed in place of the process at step 214B of the application distribution process in the second embodiment.

In particular, at step 213, the determination unit 15 acquires a service URL corresponding to the combination of the application ID and the ticket information 72 received from the terminal 20 from the allocation table 86A stored in the storage unit 17 of the application distribution server 30B. At next step 215, the controller 16 first extracts, from an application acquired at step 210 or step 212, a service requesting step included in the application. Then, the controller 16 sets the service URL acquired by the determination unit 15 as an access destination when a service request is to be transmitted to the service requesting step extracted from the application. Then, at next step 219, the controller 16 transmits the application in which the service URL is set to the service requesting step to the terminal 20 of the transmission source together with the application ID.

Figure 22:
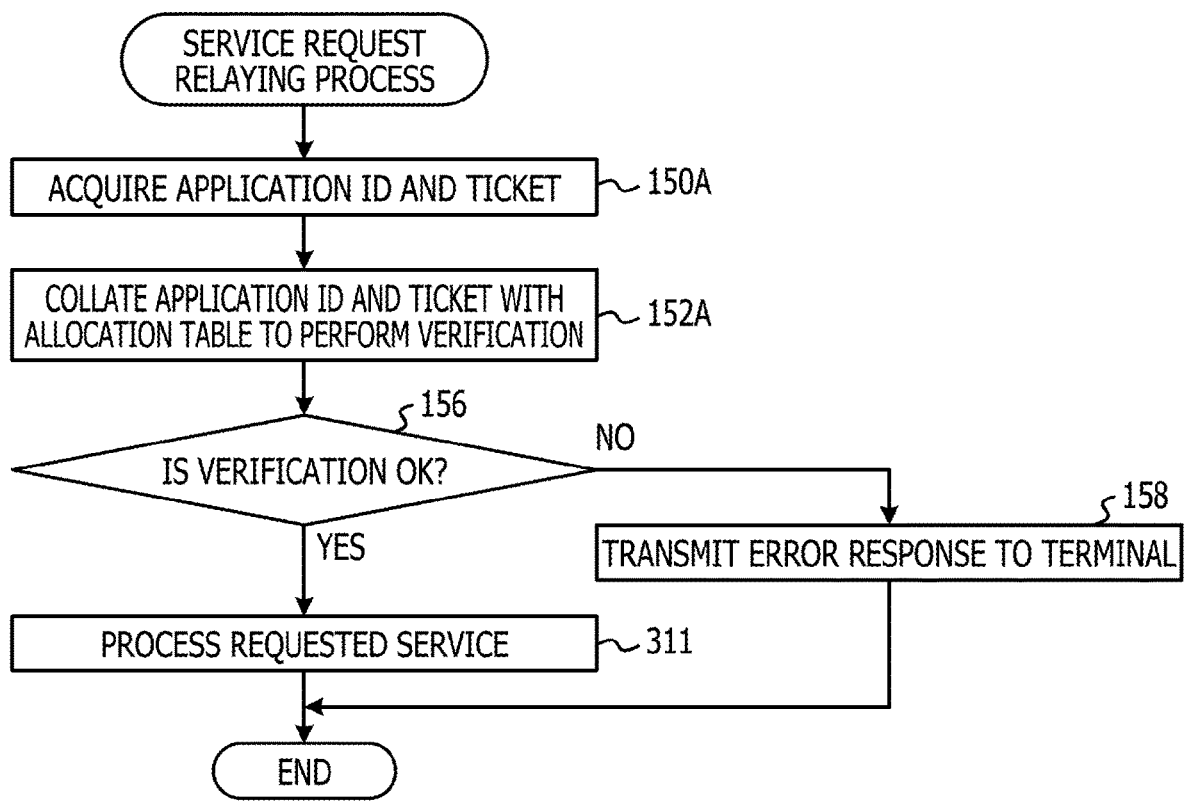
FIG. 22 is a flow chart illustrating an example of a service request reception process in the third embodiment.

Now, a service request reception process executed by a service providing server in the present third embodiment with reference to FIG. 22 is described only in regard to a portion thereof which is different from that of the service request relaying process (FIG. 17) described hereinabove in connection with the second embodiment. The service providing server described with reference to FIG. 22 may be the service providing server 50C illustrated in FIG. 19. In the service request relaying process (FIG. 17) described hereinabove in connection with the second embodiment, the determination unit 15 acquires a service URL at step 306A, and the controller 16 transfers a service request to the service URL at step 310.

In contrast, in the service request reception process in the present third embodiment, a program included in the single service processing program data 52A stored in the storage unit 19 is executed at step 311 in place of the processes at steps 306A and 310 described hereinabove. Consequently, a service requested from the terminal 20 is processed.

Now, a flow of an entire process in the present third embodiment is described with reference to FIG. 23. If the application distribution server 30B receives situation information corresponding to check-in from a terminal 20, then it transmits ticket information 72 corresponding to the situation of the terminal 20 to the terminal 20. Further, the determination unit 15 of the application distribution server 30B acquires a service URL corresponding to the combination of the application ID and the ticket information 72 received from the terminal 20 from the allocation table 86A.

Then, the controller 16 of the application distribution server 30B sets the service URL acquired by the determination unit 15 as an access destination to the service requesting step in the application to be distributed to the terminal 20 and distributes the application to the terminal 20. It is to be noted that, in FIG. 23, the service URL set by the controller 16 is represented as "URLα/x" or "URLβ/y." It is to be noted that the process described above by the controller 16 is an example of that "application software wherein access destination information representative of a determined access destination is set as a transmission destination of a service request is transmitted to a terminal."

The application distributed from the application distribution server 30B to the terminal 20 is stored into the memory 62 once and then is executed suitably in response to an instruction input or the like from the user of the terminal 20. In the present third embodiment, a service URL is set as an access destination in the service requesting step in each of the applications. Therefore, if the service requesting step is executed in the application being executed by the terminal 20, then a service request is transmitted to the service providing server 50C, which provides a service corresponding to the application being executed and the situation of the terminal 20, by the transmission unit 21.

The second reception unit 13 of the service providing server 50C receives the service request, the application ID, and the ticket information 72 transmitted from the terminal 20. The verification unit 14 of the service providing server 50C verifies whether or not the combination of the application ID and the ticket information 72 received from the terminal 20 is registered in the allocation table 86B. If the combination of the received application ID and the ticket information 72 is registered in the allocation table 86B, then the program included in the service processing program data 52A is executed. Consequently, a process for providing the service requested from the terminal 20 to the terminal 20 is performed by the service processor 52B.

In this manner, also in the present third embodiment, service URLs different from each other are allotted to a plurality of service processing program data 52A (service providing server 50C). Further, a service URL of the service processing program data 52A corresponding to the situation of the terminal 20 indicated by the ticket information received from the terminal 20 is determined. Then, the determined service URL is set as an access destination to the service requesting step included in the application, and the application is distributed to the terminal 20. This makes it possible not to incorporate a function for detecting a situation of a terminal 20 and switching the access destination or process contents into an application and a service processing program data 52A, and switching of a service to be provided in response to a situation of a terminal 20 can be implemented by a simple and easy configuration. Further, also the development man-hour and cost of an application and service processing program data 52A can be reduced. It is to be noted that the other working effects are similar to those of the second embodiment, and the advantageous effects are omitted herein to avoid redundancy.

Fourth Embodiment

In the embodiments described above, a single application is associated with a plurality of situations, and where the plurality of situations can be established simultaneously, an instance (also called "thread") of the application operates independently in each situation. Therefore, the convenience in use of the application is sometimes inferior. For example, this may be a case in which an application for displaying a timetable (hereinafter referred to as "timetable application") is distributed and executed in a situation of "teacher" and another situation of "classroom" and one of the instances acquires and displays the schedule of the teacher and the other acquires and displays the schedule of the classroom. In this case, none of both instances of the application can display the schedule of the teacher and the schedule of the classroom in an overlapping relationship. It is to be noted that, in the following description, the situation of "teacher" is referred to as "teacher situation" and the situation of "classroom" is referred to as "classroom situation."

The problem described above can be solved if an instance of a certain application can use a common use region allotted to a different instance of the same application. For example, an instance of the timetable application corresponding to a classroom situation writes a schedule of a classroom into a common use region between the instances of the timetable application. On the other hand, if the instance of the timetable application corresponding to the teacher situation reads out the schedule of the classroom from the common use region, then the schedule of the classroom can be displayed in an overlapping relationship with the schedule of the teacher.

Further, separate from the case in which the common use region is commonly used between instances of the same application activated in different situations, the common use region may be used commonly between instances of different applications activated in the same situation or the common use region may be commonly used between instances of different applications activated in different situations. For example, a case may occur in which an instance of the timetable application corresponding to the classroom situation writes a schedule of the classroom into the common use region for the classroom situation and the projector application corresponding to the classroom situation reads in the schedule of the classroom from the common use region and displays the schedule.

In the description of the present fourth embodiment, description is given of a mode in which, when a service request is transmitted from an application, a common use key that defines a range of a service is transmitted simultaneously to implement common use between instances. It is to be noted that like elements to those of the fourth embodiment are denoted by like reference symbols to those of the first embodiment, and overlapping description of them is omitted herein.

Figure 24:
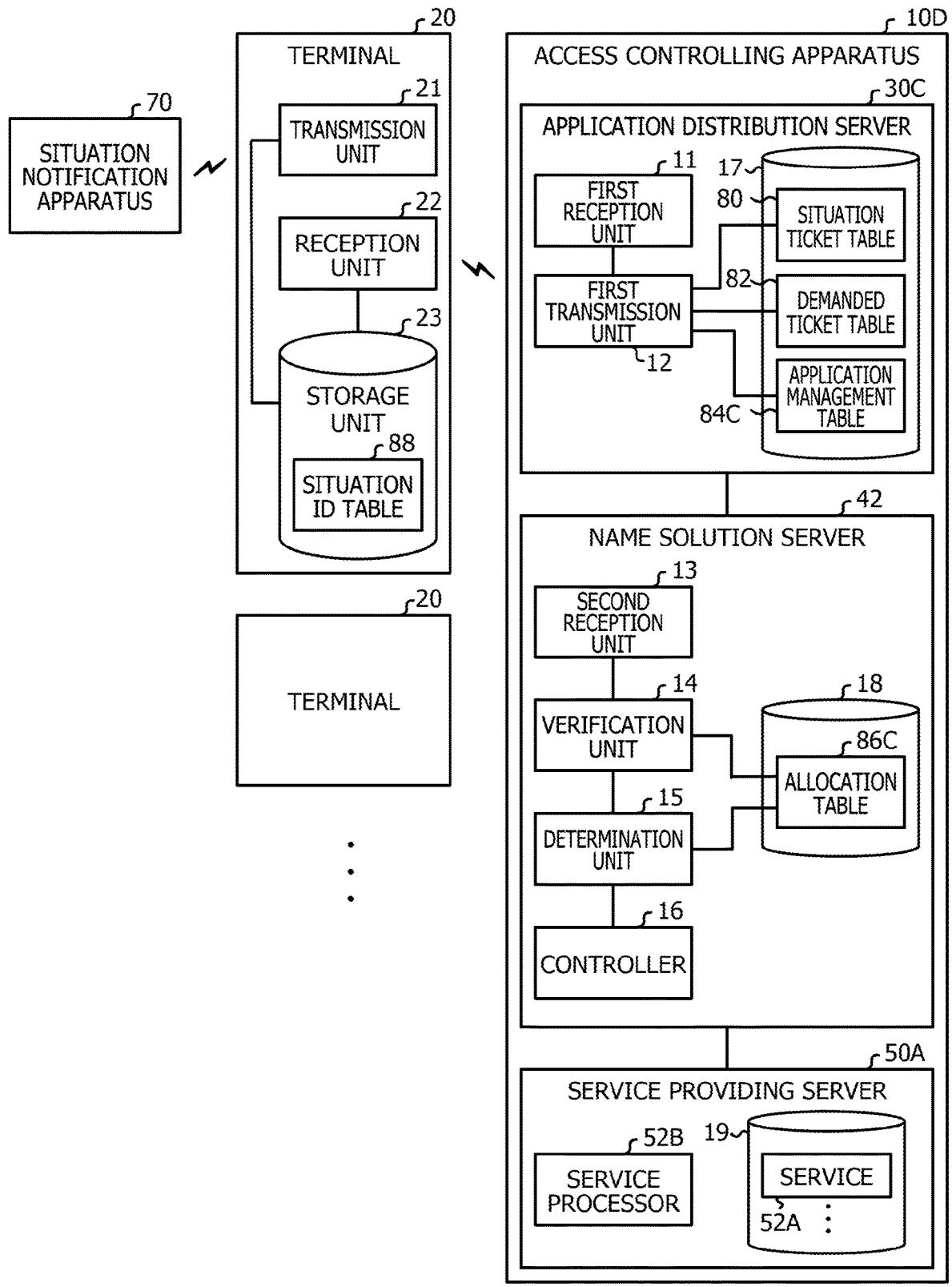
FIG. 24 is a functional block diagram of an access controlling apparatus and terminals according to a fourth embodiment.

FIG. 24 is a functional block diagram of an access controlling apparatus and terminals according to the fourth embodiment. As depicted in FIG. 24, an access controlling apparatus 10D in the fourth embodiment is different from the access controlling apparatus 10A described hereinabove in connection with the first embodiment in that the access controlling apparatus 10D includes an application distribution server 30C in place of the application distribution server 30A. The application distribution server 30C is different from the application distribution server 30A in that an application management table 84C is stored in a storage unit 17 in place of the application management table 84A.

Figure 26:
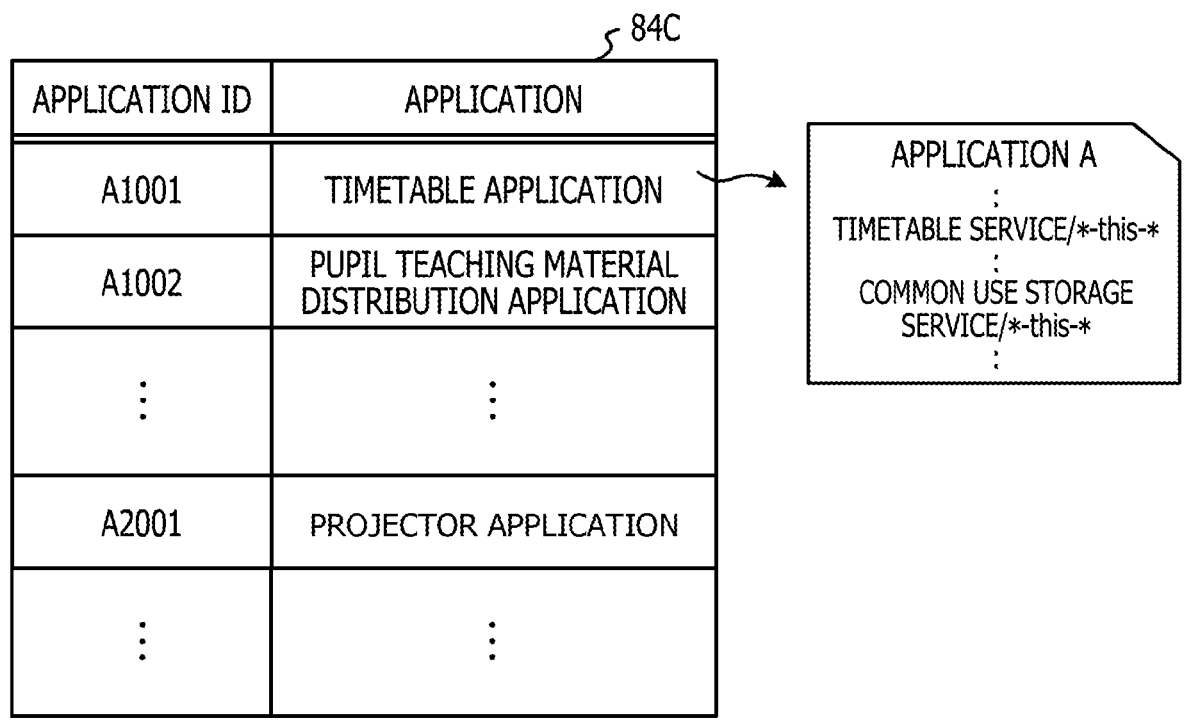
FIG. 26 is a view illustrating an example of an application management table according to the fourth embodiment.

FIG. 26 is a view illustrating an example of an application management table. The application management table illustrated in FIG. 26 may be the application management table 84C illustrated in FIG. 24. As depicted in FIG. 26, the application management table 84C is similar to the application management table 84A in that application IDs and (program main bodies) of applications are registered in an associated relationship with each other. However, the (program main bodies of the) individual applications registered in the application management table 84C are different from those in the application management table 84A. In particular, in the service requesting step of each of the applications, a service name indicative of a name of a service to be requested and a common use key that defines a range of the service to be requested are set. In the present fourth embodiment, if the service requesting step in an application is executed by a terminal 20, then a service request to which an application ID, ticket information 72, a service name, and a common use key are added is transmitted by the transmission unit 21.

In the example depicted in FIG. 26, an application A includes a row in which a character string of "timetable service/*-this-*" is described and another row in which a character string of "common use storage service/*-this-*" is described. The rows correspond to the service requesting steps. Further, of the character strings described above, the portion of "timetable service/" or "common use storage service/" corresponds to a service name. Further, of the character strings described above, the portion of "*-this-*" corresponds to the common use key.

In the present fourth embodiment, the common use key includes three variables (first to third variables) delimited by a delimiter "-." Of the common use key, the second variable defines a service range relating to the application, and the third variable defines a service range regarding a situation of the terminal 20. Further, in the present fourth embodiment, the value of the first to third variables of the common use key is "*" that indicates that the service range is not limited or "this" indicates that the service range is limited to the value at present.

For example, a case is considered in which a service request to which the common use key "*-this-this" is added is transmitted from the timetable application being executed by the terminal 20 of the "classroom situation" to the timetable service that distributes the timetable to a terminal 20. In this case, since the second variable that defines the service range relating to the application is "this," the service range relating to the application is limited to the value at present, namely, to the time table application. Further, since the third variable that defines a service range relating to the situation of the terminal 20 is also "this," the service range relating to the situation is limited to the value at present, namely, to the "classroom situation." In this case, in the timetable service, a service for distributing a schedule of the classroom to the terminal 20 is performed as a service of the timetable application whose service range is "classroom situation."

Further, for example, a case is considered in which a service request to which the common use key "*-this-*" is added is transmitted from the timetable application being executed by the terminal 20 of "classroom situation" to the common use storage service that provides a common use region to the terminal 20. In this case, since the second variable that defines the service range relating to the application is "this," the service range relating to the application is limited to the value at present, namely, to the timetable application. Further, since the third variable that defines the service range relating to the situation of the terminal 20 is "*," the service range relating to the situation is not limited. Accordingly, in this case, in the common use storage service, a service for providing a common use region that is accessible, in the timetable application, irrespective of the situation of the terminal 20 is performed as a service whose service range is the timetable application.

It is to be noted that, although the first variable in the present fourth embodiment is not defined specifically, the first variable may be used as a variable for defining a service range, for example, relating to a terminal. In this case, if the first variable is "this," then the service range is limited to the own terminal 20, but if the first variable is "*," then the limitation to the service range relating to the terminal 20 is cancelled. Alternatively, the first variable may be used as a variable for defining a service range relating to a situation different in category from that of the third variable. For example, it is imagined to make the first variable correspond to a situation representing the inside or the outside of the school of the management target. In this case, if the first variable is "this" and the own terminal 20 is positioned indoors, then the service range is limited to the terminal 20 positioned indoors, but if the first variable is "this" and the own terminal 20 is positioned outdoors, then the service range is limited to terminals 20 that are located outdoors. Further, if the first variable is "*," then the limitation to the service range depending upon whether the terminal 20 is located indoors or outdoors is cancelled.

It is to be noted that, in the common use key described above, the number of values that can be taken by each variable may be three or more, or the number of variables may be increased or decreased. The common use key described above is an example of the service range information, and any information can be applied as the service range information if the information can define a service range.

Developers of individual applications can make it possible for a terminal 20 to receive provision of a service within a desired service range only by describing a service name and a common use key in the service requesting step of the application to be developed. Therefore, the man-hour and the cost for development of the application are reduced in comparison with an alternative case in which a URL or the like of a service processing program data 52A that provides a service within a desired service range is described in the service requesting step.

Further, the access controlling apparatus 10D of the fourth embodiment is different from the access controlling apparatus 10A described hereinabove in connection with the first embodiment also in that a name solution server 42 is provided in place of the relay server 40. The name solution server 42 includes a second reception unit 13, a verification unit 14, a determination unit 15, a controller 16, and a storage unit 18 similarly to the relay server 40. However, the name solution server 42 is different from the relay server 40 in that an allocation table 86C is stored in the storage unit 18 in place of the allocation table 86A.

FIG. 27 is a view illustrating an example of an allocation table. The allocation table illustrated in FIG. 27 may be the allocation table 86C illustrated in FIG. 24. As depicted in FIG. 27, the allocation table 86C stores therein, in addition to application IDs, allocation tickets, and service URLs, service names and common use keys in an associated relationship with each other. In the present fourth embodiment, the individual service processing program data 52A stored in a storage unit 19 of a service providing server 50A are different from each other in at least one of the type of a service to be provided, the situation of the corresponding terminal 20, and the service range. Further, to the individual service processing program data 52A stored in the storage unit 19, service URLs different from one another are allotted similarly as described in the first embodiment. To the allocation table 86C, the items of service name and common use key are added in order to distinguish those service processing program data 52A that are same in type of the service and situation of the corresponding terminal 20 but are different in service range from one another.

Figure 25:
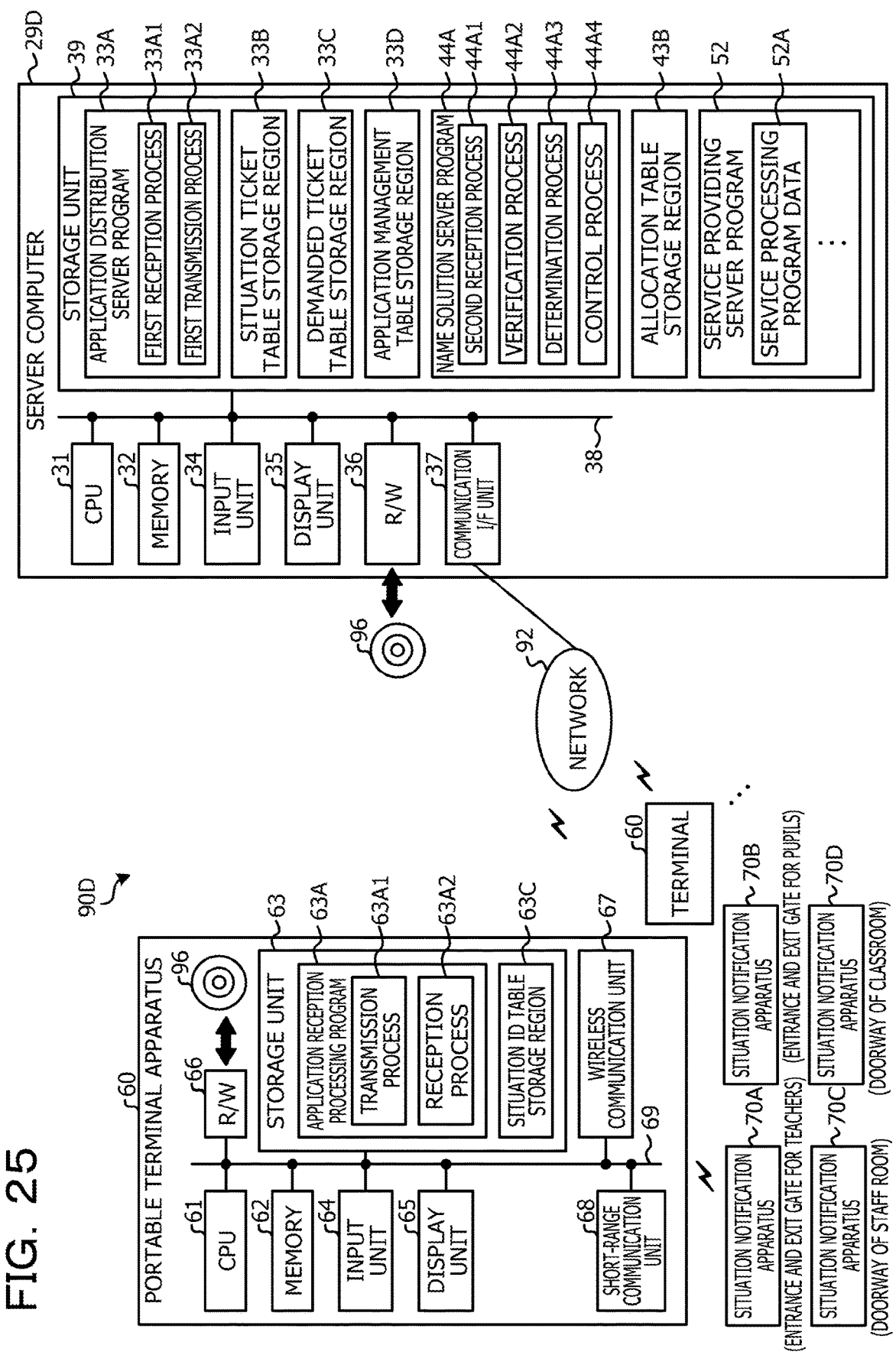
FIG. 25 is a schematic block diagram of a computer system according to the fourth embodiment.

FIG. 25 is a schematic block diagram of a computer system. The access controlling apparatus 10D described above can be implemented by a server computer 29D included in a computer system 90D depicted in FIG. 25. A storage unit 39 of the server computer 29D stores an application distribution server program 33A, a name solution server program 44A, and a service providing server program 52. It is to be noted that the name solution server program 44A is a program for causing the server computer 29D to function as the name solution server 42.

A CPU 31 of the server computer 29D reads out the name solution server program 44A from the storage unit 39 and develops the name solution server program 44A in a memory 32 and then successively executes processes the name solution server program 44A has. The name solution server program 44A includes a second reception process 44A1, a verification process 44A2, a determination process 44A3, and a control process 44A4. The CPU 31 operates as the second reception unit 13 depicted in FIG. 24 by executing the second reception process 44A1. Further, the CPU 31 operates as the verification unit 14 depicted in FIG. 24 by executing the verification process 44A2. Further, the CPU 31 operates as the determination unit 15 depicted in FIG. 24 by executing the determination process 44A3. Furthermore, the CPU 31 operates as the controller 16 depicted in FIG. 24 by executing the control process 44A4. Consequently, the server computer 29D that executes the name solution server program 44A functions as the name solution server 42 depicted in FIG. 24.

Figure 28:
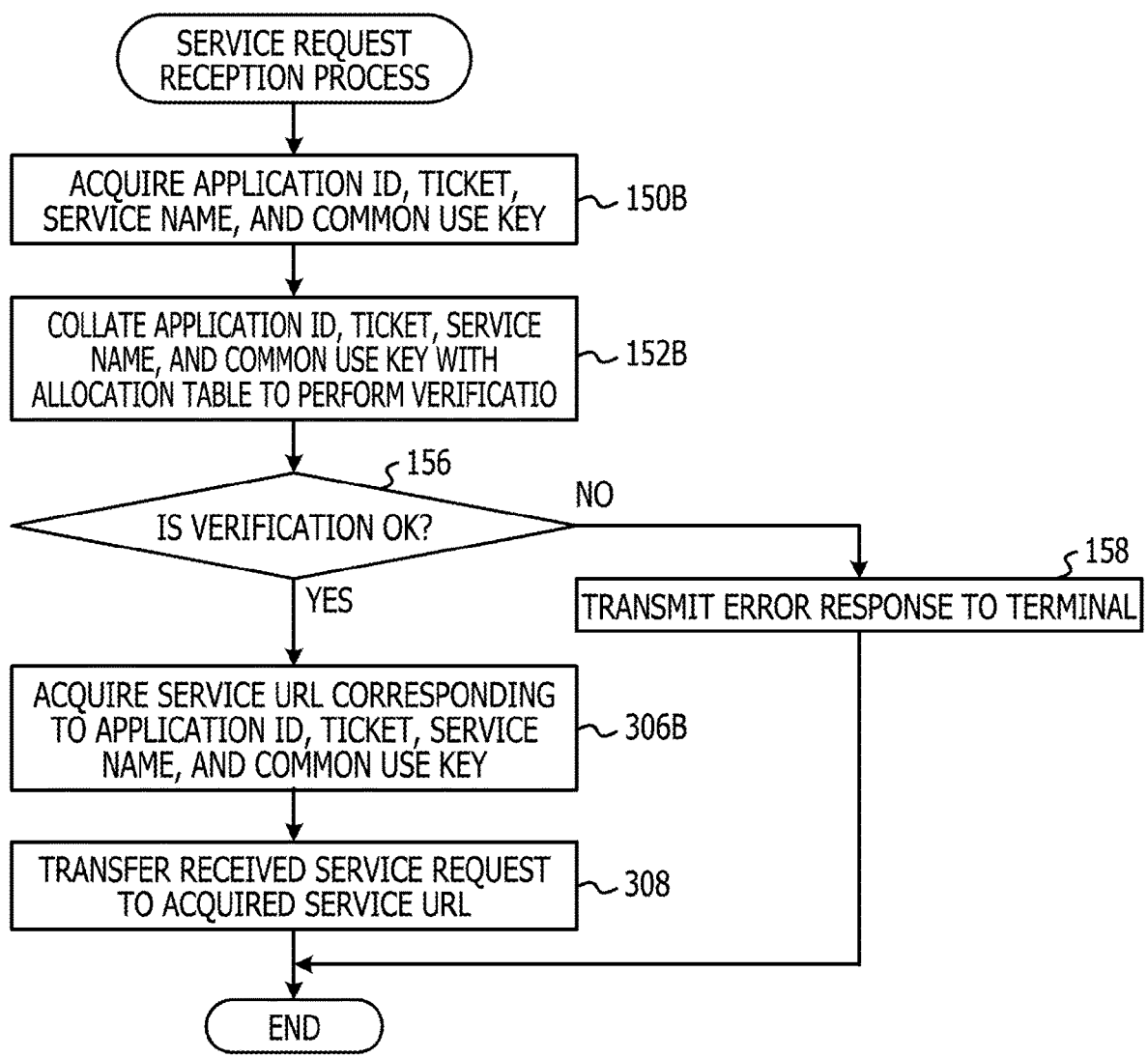
FIG. 28 is a flow chart illustrating an example of a service request reception process in the fourth embodiment.

Now, as action of the present fourth embodiment, a service request reception process executed by a name solution server is described first with reference to FIG. 28 in regard to portions thereof different from the service request relaying process (FIG. 11) described hereinabove in connection with the first embodiment. The name solution server described with reference to FIG. 28 may be the name solution server 42 illustrated in FIG. 24.

At step 150B of the service request reception process, the second reception unit 13 waits that the second reception unit 13 receives a service request to which an application ID, ticket information 72, a service name, and a common use key are added from one of the terminals 20. If the information mentioned above is received from some terminal 20, then the second reception unit 13 transfers the received application ID, the ticket information 72, the service name, and the common use key to the verification unit 14. Thereafter, the processing advances to step 152B.

At step 152B, the verification unit 14 verifies whether or not the combination of the application ID, the ticket information 72, the service name, and the common use key passed from the second reception unit 13 is registered in the allocation table 86C. At next step 156, the verification unit 14 decides whether or not the received service request is a legitimate service request. Then, if an affirmative decision is made, then the processing advances the processing to step 306B.

At step 306B, the determination unit 15 reads out a service URL corresponding to the combination of the received application ID, the ticket information 72, the service name, and the common use key from the allocation table 86A to acquire the service URL. Then at next step 308, the controller 16 transfers the service request received from the terminal 20 to the service URL acquired by the determination unit 15.

In the service providing server 50A that receives the service request described above transferred (relayed) by the name solution server 42, the service processing program data 52A to which the service URL described hereinabove is allotted is accessed. Consequently, a program included in the accessed service processing program data 52A is executed. Then, the service processor 52B performs a process for providing a service corresponding to the application ID, the ticket information 72, the service name, and the common use key transmitted from the terminal 20 to the terminal 20.

Figure 29:
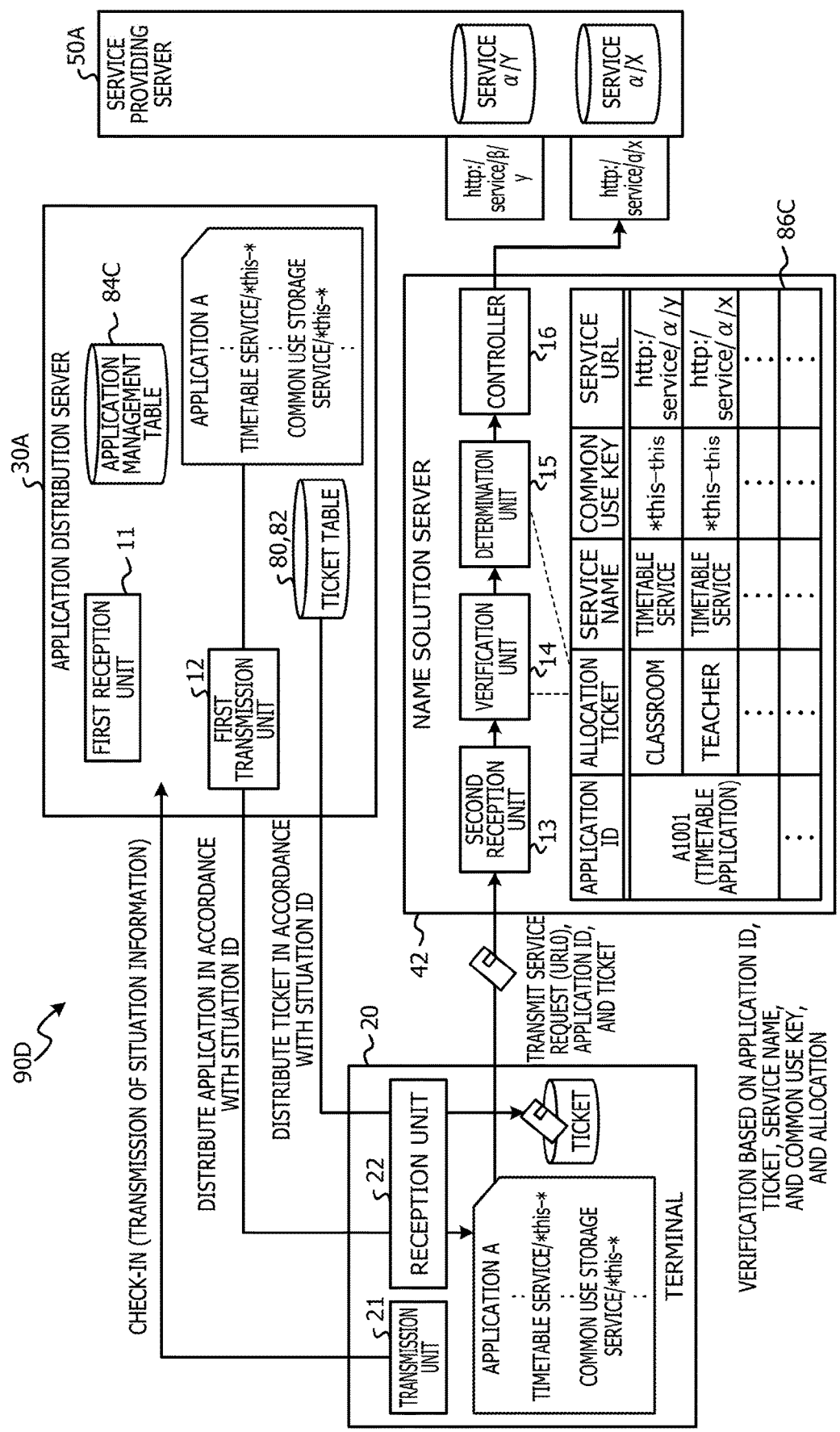
FIG. 29 is a schematic view illustrating an example of a flow of entire processing in the fourth embodiment.

Now, a flow of an entire process in the present fourth embodiment is described with reference to FIG. 29. It is to be noted that the flow of various processes after some terminal 20 checks in to some place and an application is distributed from the application distribution server 30C is similar to that in the first embodiment (FIG. 12), and therefore, overlapping description of the flow is omitted herein.

The application distributed from the application distribution server 30C to the terminal 20 is stored into the memory 62 once and then is executed suitably in response to an instruction input or the like from the user of the terminal 20. As described hereinabove, in the present fourth embodiment, the service requesting step in each application has an application name and a common use key described therein. Therefore, if the service requesting step in the application is executed by the terminal 20, then a service request to which an application ID, ticket information, a service name, and a common use key are added is transmitted by the transmission unit 21.

It is to be noted that, since, in the present embodiment, the service request is an HTTP request, the service request described above is received by the name solution server 42 for name solution if an access destination that does not cause an error in the protocol is set therein.

If the service request is received from the terminal 20, then the verification unit 14 in the name solution server 42 decides that the verification is OK if the combination of the application ID, the ticket information, the service name, and the common use key received together with the service request exists in the allocation table 86C. If it is decided by the verification unit 14 that the verification is OK, then the name solution server 42 acquires a service URL corresponding to the combination of the received application ID, the ticket information, the service name, and the common use key from the allocation table 86C by the determination unit 15. Then, the controller 16 transfers the service request received from the terminal 20 to the acquired service URL. Consequently, the service providing server 50A performs a process for providing a service corresponding to the application ID, the ticket information 72, the service name, and the common use key transmitted from the terminal 20 to the terminal 20.

Figure 31:
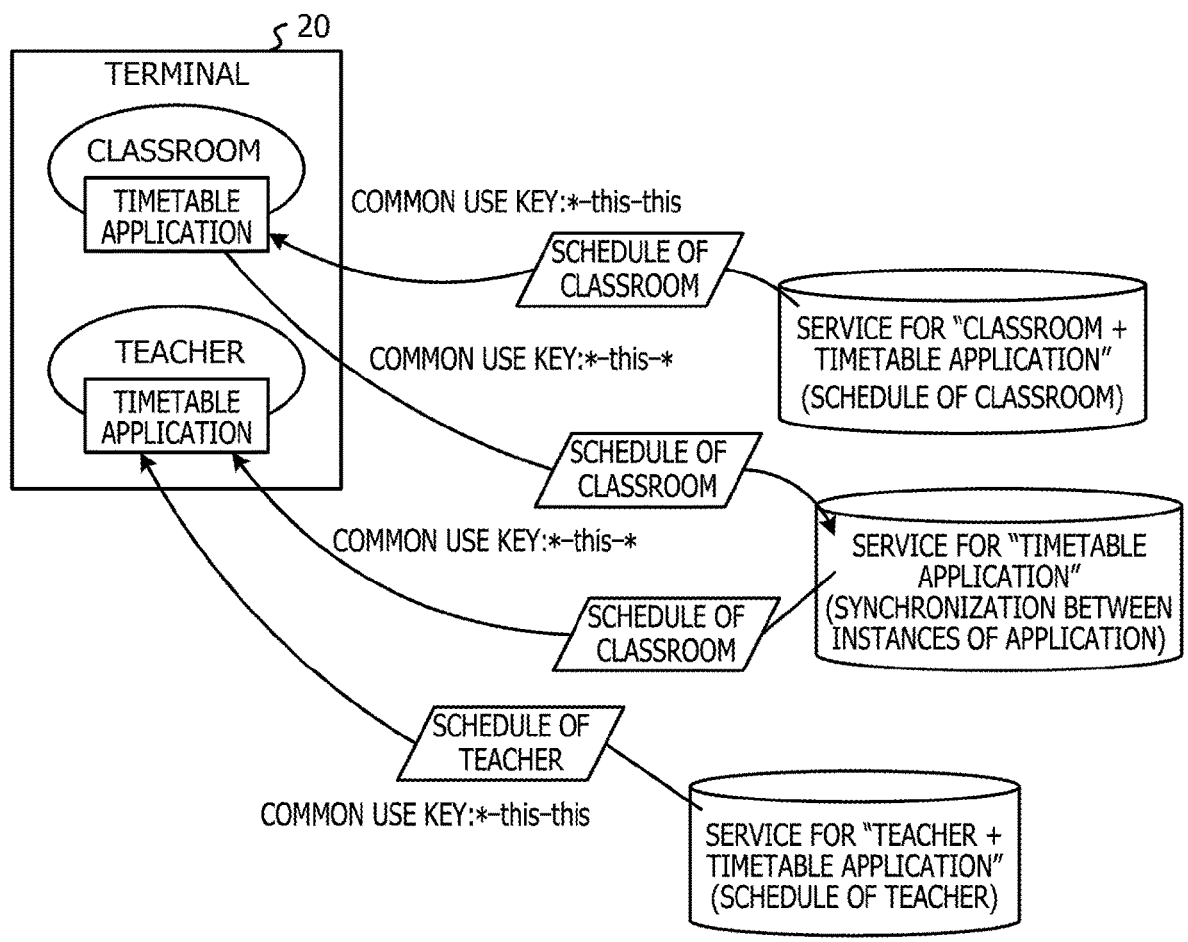
FIG. 31 is a schematic view illustrating an example of a flow of use of a service by an application in the fourth embodiment.
Figure 32:
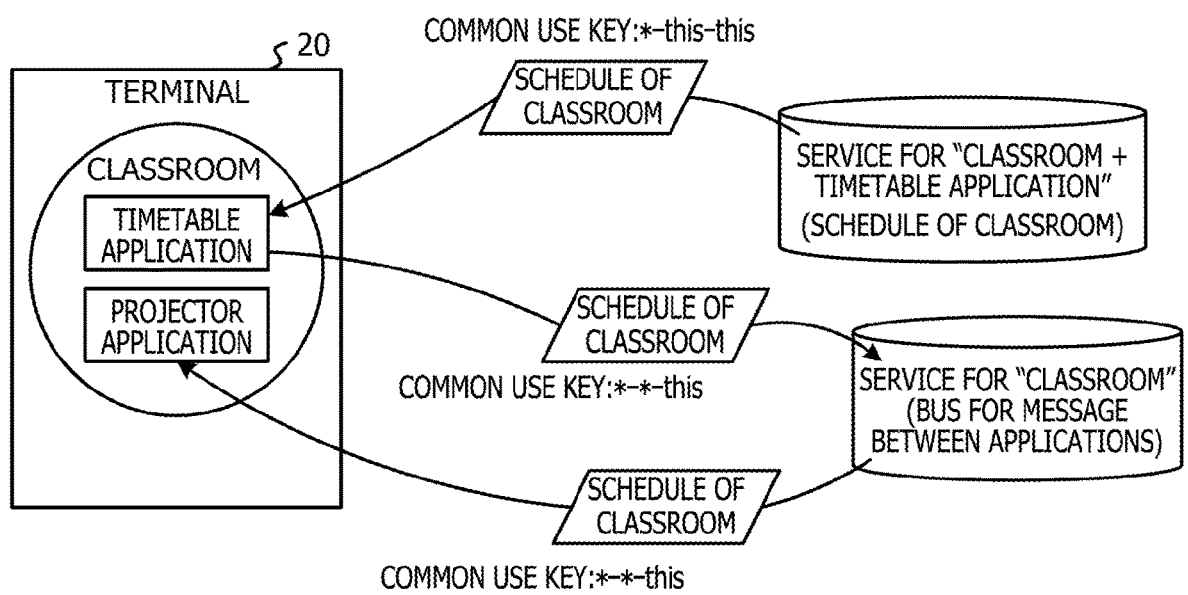
FIG. 32 is a schematic view illustrating an example of a flow of use of a service by an application in the fourth embodiment.

Now, an example of a flow of utilization of a service through an application in the present fourth embodiment is described with reference to FIGS. 30 to 32.

Figure 30:
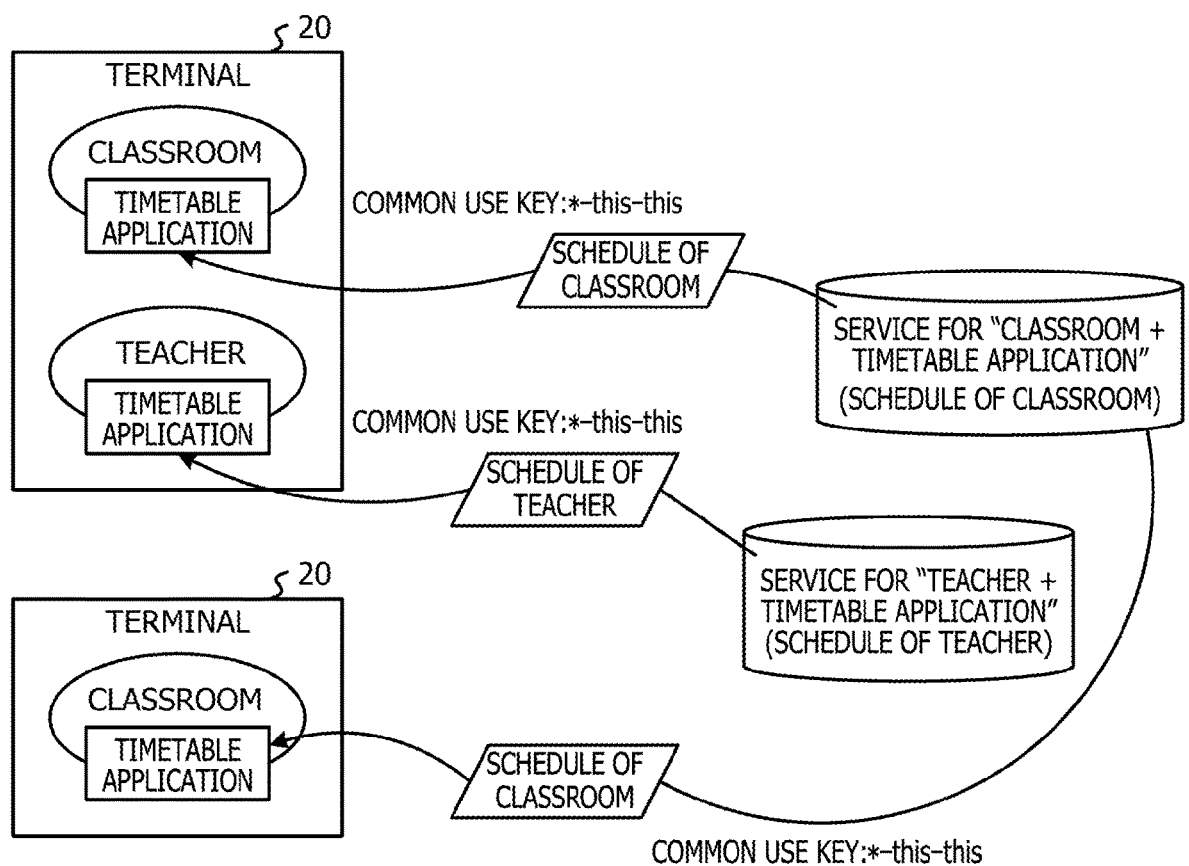
FIG. 30 is a schematic view illustrating an example of a flow of use of a service by an application in the fourth embodiment.

FIG. 30 illustrates a situation in which a first terminal 20 depicted on the upper side in FIG. 30 is in a state in which the timetable application is distributed in a classroom situation and a teacher situation and an instance is executed while a second terminal 20 depicted on the lower side in FIG. 30 is in a state in which the timetable application is distributed only in a classroom situation and an instance is executed. This situation may be, for example, a situation in which the user of the first terminal 20 is a teacher and is in a classroom while the user of the second terminal 20 is a pupil and is in a classroom same as that in which the teacher is.

Here, if the user (teacher) of the first terminal 20 desires confirmation of a schedule of the classroom in which the user is, then the user would instruct the instance of the timetable application corresponding to the classroom situation to acquire a timetable. In response to the instruction, a service request including an application ID of the timetable application, ticket information indicative of the classroom situation, a service name of a timetable service, and a common use key "*-this-this" is transmitted from the instance of the timetable application corresponding to the classroom situation. The service range indicated by the common use key described above is "application=timetable application" and "situation=classroom situation." Therefore, the service request described above is transferred by the name solution server 42 to service processing program data 52A that provides a service for distributing a timetable to the timetable application of the terminal 20 of the classroom situation, namely, a service for distributing a timetable of the classroom. Then, a schedule of the classroom is distributed from the service providing server 50A to the instance of the timetable application corresponding to the classroom situation of the first terminal 20.

It is to be noted that also the user (pupil) of the second terminal 20 would instruct, if the user desires confirmation of a timetable of the classroom in which the user is, the instance of the timetable application corresponding to the classroom situation to acquire the timetable. In response to the instruction, a service request including an application ID of the timetable application, ticket information indicative of the classroom situation, a service name of a timetable service, and the common use key "*-this-this" is transmitted from the instance of the timetable application corresponding to the classroom situation similarly as described above. Then, the service request is transferred by the name solution server 42 to the service processing program data 52A same as that described above which provides a service for distributing a timetable of the classroom. Then, the schedule of the classroom distributed to the first terminal 20 from the service providing server 50A is distributed from the service providing server 50A also to the second terminal 20.

On the other hand, if the user (teacher) of the first terminal 20 desires confirmation of a schedule of the teacher itself, then the user would instruct the instance of the timetable application corresponding to the teacher situation to acquire the timetable. In accordance with the instruction, a service request including an application ID of the timetable application, ticket information indicative of the teacher situation, a service name of a timetable service, and the common use key "*-this-this" is transmitted from the instance of the timetable application corresponding to the teacher situation. The service range indicated by the common use key described above is "application=timetable application" and "situation=teacher situation." Therefore, the service request described above is transferred by the name solution server 42 to service processing program data 52A that provides a service for distributing the timetable to the timetable application of the terminal 20 of the teacher situation, namely, a service for distributing the timetable of the teacher. Then, the timetable of the teacher is distributed from the service providing server 50A to the instance of the timetable application corresponding to the teacher situation of the first terminal 20.

As described hereinabove, in this case, the instance of the timetable application corresponding to the classroom situation of the first terminal 20 acquires only the schedule of the classroom, and the instance of the timetable application corresponding to the teacher situation of the first terminal 20 acquires only the schedule of the teacher. Therefore, none of the instances of the timetable application can display the schedule of the teacher and the schedule of the classroom in an overlapping relationship with each other.

In contrast, in the present fourth embodiment, the problem described hereinabove can be solved, for example, by a flow of utilization of a service illustrated in FIG. 31. In particular, the user (teacher) of the first terminal 20 would instruct one of the instances of the timetable application (here, the instance corresponding to the classroom situation) to write out the schedule of the classroom into the common use region between the instances of the same application. In accordance with the instruction, a service request including an application ID of the timetable application, ticket information indicative of the classroom situation, a service name of the common use storage service, and a common use key "*-this-*" is transmitted from the instance of the timetable application corresponding to the classroom situation. The service range indicated by the common use key described above is "application=timetable application" and "situation=no limitation." Therefore, the service request described above is transferred by the name solution server 42 to the service processing program data 52A that provides a service for allotting a common use region to the timetable application irrespective of the situation of the terminal 20. Then, a common use region that can be commonly used between the instances of the timetable application is allotted from the service providing server 50A to the instance of the timetable application corresponding to the classroom situation of the first terminal 20. Consequently, the instance of the timetable application corresponding to the classroom situation performs a process for writing out the schedule of the classroom acquired previously and retained therein into the allotted common use region in accordance with an instruction from the user.

Then, the user (teacher) of the first terminal 20 would instruct the other instance of the timetable application (here, the instance corresponding to the teacher situation) to read in the schedule of the classroom from the common use region between the instances of the same application. In accordance with the instruction, a service request including an application ID of the timetable application, ticket information indicative of the teacher situation, a service name of the common use storage service, and the common use key "*-this-*" is transmitted from the instance of the timetable application corresponding to the teacher situation. The service range indicated by the common use key described above is "application=timetable application" and "situation=no limitation." Therefore, the service request described above is transferred by the name solution server 42 to the service processing program data 52A that provides a service for allotting a common use region to the timetable application irrespective of the situation of the terminal 20. Then, a common use region same as that allotted to the instance of the timetable application corresponding to the classroom situation is allotted from the service providing server 50A to the instance of the timetable application corresponding to the teacher situation of the first terminal 20. Consequently, the instance of the timetable application corresponding to the teacher situation performs a process for reading out the schedule of the classroom written in the allotted common use region in accordance with an instruction from the user.

By the flow of utilization of the service described above, since the instance of the timetable application corresponding to the teacher situation has successfully acquired also the timetable of the classroom in addition to the timetable of the teacher, it is possible to display the schedule of the teacher and the schedule of the classroom in an overlapping relationship with each other.

Now, an example of a flow of utilization of a service when information is transferred between instances of different applications in the present fourth embodiment is described with reference to FIG. 32. FIG. 32 illustrates a situation in which the timetable application and the projector application are distributed in the classroom situation and instances of the applications are executed in a terminal 20. It is to be noted that a flow of processing when the schedule of the classroom is acquired through the timetable application corresponding to the classroom situation is described hereinabove, and therefore, overlapping description of the flow of processing is omitted. Here, if the schedule of the classroom acquired thorough the timetable application corresponding to the classroom situation is to be projected by a projector installed in the classroom, such projection can be implemented by a flow of utilization of a service illustrated in FIG. 32.

In particular, the user of the terminal 20 would instruct the instance of the timetable application corresponding to the classroom situation to write out the schedule of the classroom into the common use region between the instances of the application of the same classroom situation. In accordance with the instruction, a service request including an application ID of the timetable application, ticket information indicative of the classroom situation, a service name of the common use storage service, and a common use key "*-*-this" is transmitted from the instance of the timetable application corresponding to the classroom situation. The service range indicated by the common use key described hereinabove is "application=no limitation" and "situation=classroom situation." Therefore, the service request described above is transferred by the name solution server 42 to the service processing program data 52A that provides a service for allotting a common use region to the application of the terminal 20 of the classroom situation irrespective of the type of the application. Then, a common use region that can be commonly used between the instances of the application of the terminal 20 of the classroom situation is allotted from the service providing server 50A to the instance of the timetable application corresponding to the classroom situation of the terminal 20. Consequently, the instance of the timetable application corresponding to the classroom situation performs a process for writing out the schedule of the classroom acquired previously and retained therein into the allotted common use region in accordance with an instruction from the user.

Then, the user (teacher) of the first terminal 20 would instruct the instance of the projector application corresponding to the classroom situation to read in the schedule of the classroom from the common use region between the instances of the application of the terminal 20 of the classroom situation. In response to the instruction, a service request including an application ID of the projector application, ticket information indicative of the classroom situation, a service name of a common use storage service, and the common use key "*-*-this" is transmitted from the instance of the projector application corresponding to the classroom situation. The service range indicated by the common use key described above is "application=no limitation" and "situation=classroom situation." Therefore, the service request described above is transferred by the name solution server 42 to the service processing program data 52A that provides a service for allotting a common use region to the application of the terminal 20 of the classroom situation irrespective of the type of the application. Then, the common use region same as that of the instance of the timetable application corresponding to the classroom situation is allotted to the instance of the projector application corresponding to the classroom situation of the terminal 20 from the service providing server 50A. Consequently, the instance of the projector application corresponding to the classroom situation performs a process for reading out the schedule of the classroom written in the allotted common use region in accordance with an instruction from the user.

Since the instance of the projector application corresponding to the classroom situation can acquire the timetable of the classroom by the flow of utilization of the service described above, it is possible to project the schedule of the classroom by the projector installed in the classroom.

In this manner, in the present fourth embodiment, applications registered in the application management table 84C are set such that, upon transmission of a service request, they transmit a service request including an application ID, ticket information 72, a service name, and a common use key. Further, the individual service processing program data 52A stored in the storage unit 19 of the service providing server 50A are different from each other in one of the type of a service to be provided, the situation of the corresponding terminal 20, and the service range. Further, the individual service processing program data 52A have service URLs allotted thereto which are different from each other. The name solution server 42 acquires a service URL corresponding to the combination of the application ID, the ticket information 72, the service name, and the common use key added to the service request received from a terminal 20. Then, the name solution server 42 transfers the service request received from the terminal 20 to the acquired service URL. Consequently, the present embodiment exhibits, in addition to the advantageous effects described hereinabove in connection with the first to third embodiments, an advantageous effect in that the man-hour and the cost for development of an application for making it possible for a terminal 20 to enjoy a service within a desired service range can be reduced. Also the man-hour and the cost for development of service processing program data 52A can be reduced.

It is to be noted that, while, in the description of the fourth embodiment, a service for allotting a common use region within a common use range corresponding to a designated service range is described as an example of a service within a service range designated by a common use key, the service is not limited to this. Various services such as, for example, a service for performing information distribution within a distribution range corresponding to a designated service range can be applied.

Further, while description is given above of a mode in which information including user attribute information and place information is applied as situation information, the situation information is not limited to this. For example, as the situation information, information indicative of some other situation such as information indicative of time or information indicative of a temperature may be applied. In this case, a terminal 20 may receive a situation notification including information indicative of time or information indicative of a temperature from the situation notification apparatus 70 or may acquire such notification from a timer or a temperature sensor provided in the terminal 20.

Further, while, in the foregoing description of the embodiments, description is given of a mode in which an application is distributed to a terminal 20 by the application distribution servers 30A to 30C, acquisition of an application is not limited to this. For example, an application may be stored (installed) in a terminal 20 in advance.

Further, while, in the foregoing description of the embodiments, a mode is described in which a service is provided by a service providing server, provision of a service is not limited to this. For example, a service may be provided from an external server.

Further, while, in the foregoing description of the embodiments, a case is described in which the access controlling method according to the disclosed technology is applied to a computer system in an educational site, the application of the access controlling method is not limited to this. For example, the access controlling method may be applied to other sites such as a company or a shopping center. In this case, in place of the classroom of the management target in the embodiments described above, a conference room of a company or shops in a shipping center may be applied. Further, in this case, information indicative of a position such as director, manager, or store manager may be included in the user attribute information.

Further, while the foregoing description is given of a mode in which programs are written from the recording medium 96 into the storage unit 39 through the R/W 36, handling of programs is not limited to this. For example, programs may be stored (installed) in advance in corresponding apparatus or may be downloaded from an external apparatus through the network 92.

Further, while the foregoing description is given of a Web service as an example of a service provided to a terminal 20, the service is not limited to this, but any service can be applied if it can be accessed from an application.

All documents, patent applications, and technical standards described herein are taken into the present specification by reference to an equivalent degree to that in a case in which it is described particularly and individually that individual documents, patent applications, and technical standards are taken in by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An access controlling method that causes a computer to execute processes, the processes comprising:
   obtaining situation information that indicates at least one of situation of a terminal;
   selecting first ticket information from among plural pieces of ticket information stored in a ticket database, the first ticket information being selected in accordance with the obtained situation information and being associated with the at least one of situation indicated by the obtained situation information;
   transmitting a software and the selected first ticket information to the terminal, the software being configured to cause the terminal to transmit a service request including the selected first ticket information;
   receiving the service request from the terminal that executes the software, the service request including the first ticket information;
   determining a service among from a plurality of services in accordance with the at least one of situation indicated by the first ticket information in the received service request, each of the plurality of services having access destinations different from each other and being associated with any of situations designed to be detected by the terminal; and
   transferring the received service request to the access destination associated with the determined service.

2. The access controlling method according to claim 1, wherein the software is configured to cause the terminal to transmit the service request to a predetermined access destination, the predetermined access destination indicating a location of the computer.

3. The access controlling method according to claim 1, wherein, when the situation information and the service request transmitted from the terminal are received, the service corresponding to the obtained situation information is determined, and the received service request is transferred to the determined access destination.

4. The access controlling method according to claim 3, wherein, the plurality of services are different from each other in at least one of a type of a service and a situation of the corresponding terminal;
   wherein, the software in which access destination information indicative of a first access destination that is to accept the service request irrespective of the type of the service is set is transmitted to the terminal; and
   wherein, when the service request and the situation information transmitted from the terminal and destined for the first access destination are received together with information representative of a type of the software, an access destination of a service is determined based on the received information.

5. The access controlling method according to claim 3, wherein, the plurality of services are different from each other in at least one of a type of a service and a situation of the corresponding terminal;
   wherein, the software in which access destination information indicative of a second access destination that is to accept the service request for a service of a particular type is set is transmitted to the terminal; and
   wherein, when the service request and the situation information destined for the second access destination by the software are received from the terminal, an access destination of a service corresponding to the situation of the terminal indicated by the situation information from between services of the particular type is determined.

6. The access controlling method according to claim 1, wherein, the software having a function for transmitting a service request to access destination corresponding to the determined service is transmitted to the terminal.

7. The access controlling method according to claim 1, wherein, to the terminal with regard to which at least one of a position and an attribute of an owner of the terminal is detected, the first ticket information in accordance with at least one of the detected position and the detected attribute is transmitted; and wherein, the situation information obtained from the terminal is the first ticket information.

8. The access controlling method according to claim 3, wherein, the software selected based on the situation of the terminal indicated by the situation information received from the terminal is transmitted to the terminal.

9. The access controlling method according to claim 1, wherein, verification information that indicates a situation in which the software being executed by the terminal transmits the service request is stored in an associated relationship with a type of the software; and wherein, when the service request and the situation information are received from the terminal together with information representative of the type of the software from which the service request and the situation information have been transmitted, the type of the software and the situation indicated by the situation information are collated with the verification information to verify whether or not the received service request is legitimate.

10. An access controlling apparatus comprising:

a memory and;

a processor, coupled to the memory, configured to:

obtain situation information that indicates at least one of situation of a terminal;

selecting first ticket information from among plural pieces of ticket information stored in a ticket database, the first ticket information being selected in accordance with the obtained situation information and being associated with the at least one of situation indicated by the obtained situation information;

transmitting a software and the selected first ticket information to the terminal, the software being configured to cause the terminal to transmit a service request including the selected first ticket information;

receiving the service request from the terminal that executes the software, the service request including the first ticket information;

determine a service among from a plurality of services in accordance with the at least one of situation indicated by the first ticket information in the received service request, each of the plurality of services having access destinations different from each other and being associated with any of situations designed to be detected by the terminal; and transfer the received service request to the access destination associated with the determined service.

11. A non-transitory computer-readable storage medium storing an access controlling program that causes a computer to execute a process comprising:

obtaining situation information that indicates at least one of situation of a terminal;

selecting first ticket information from among plural pieces of ticket information stored in a ticket database, the first ticket information being selected in accordance with the obtained situation information and being associated with the at least one of situation indicated by the obtained situation information;

transmitting a software and the selected first ticket information to the terminal, the software being configured to cause the terminal to transmit a service request including the selected first ticket information;

receiving the service request from the terminal that executes the software, the service request including the first ticket information;

determining a service among from a plurality of services in accordance with the at least one of situation indicated by the first ticket information in the received service request, each of the plurality of services having access destinations different from each other and being associated with any of situations designed to be detected by the terminal; and transferring the received service request to the access destination associated with the determined service.

* * * * *